Figure 2A:
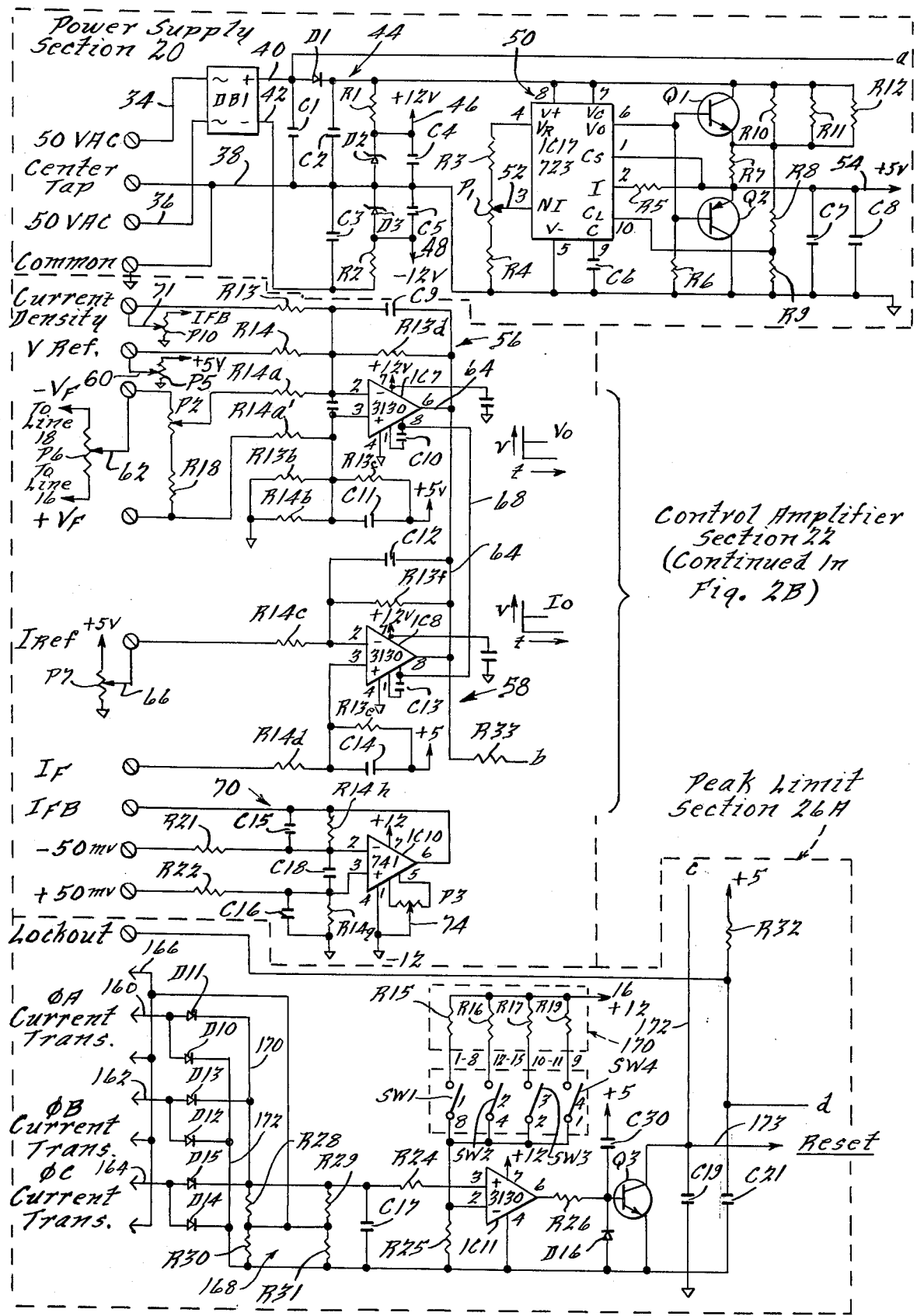

United States Patent [19]

Galloway

[11] 4,347,562
[45] Aug. 31, 1982

[54] DIGITAL POWER CONVERTER TRIGGER

[75] Inventor: James H. Galloway, New Baltimore, Mich.

[73] Assignee: Oxy Metal Industries Corporation, Warren, Mich.

[21] Appl. No.: 161,896

[22] Filed: Jun. 23, 1980

[51] Int. Cl.³ .............................................. H02P 13/26
[52] U.S. Cl. ..................................... 363/87; 363/129; 323/241
[58] Field of Search .................... 363/54, 85, 87–88, 363/128, 129; 323/241, 244, 246, 322

[56] References Cited

U.S. PATENT DOCUMENTS

| 3,611,097 | 10/1971 | Joslyn | 363/129 X |
| 3,735,241 | 5/1973 | O'Sullivan | 323/241 |
| 4,028,609 | 6/1977 | Detering | 363/129 |

Primary Examiner—William M. Shoop
Assistant Examiner—Peter S. Wong
Attorney, Agent, or Firm—Harness, Dickey & Pierce

[57] ABSTRACT

A trigger system and method for use in a line commutated power converter as used in either a rectification or an inversion mode of operation and more particularly a trigger system and method for a static converter for accurately controlling the firing angles for controlled rectifiers for converting between multiphase a-c power and d-c power by use of digital signal having magnitudes which are varied for varying firing angles for providing a converted output having a regulated voltage and/or current.

22 Claims, 5 Drawing Figures

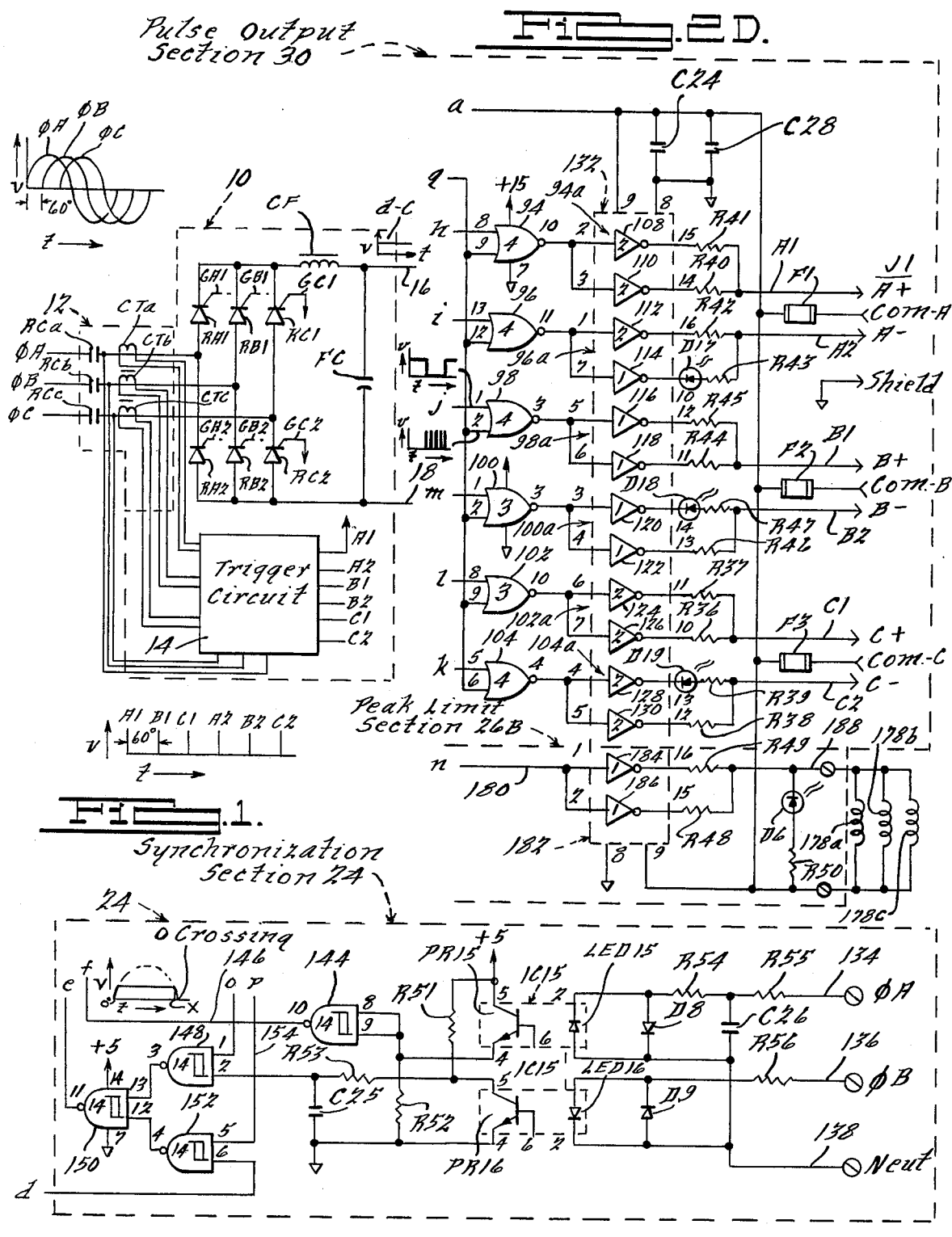

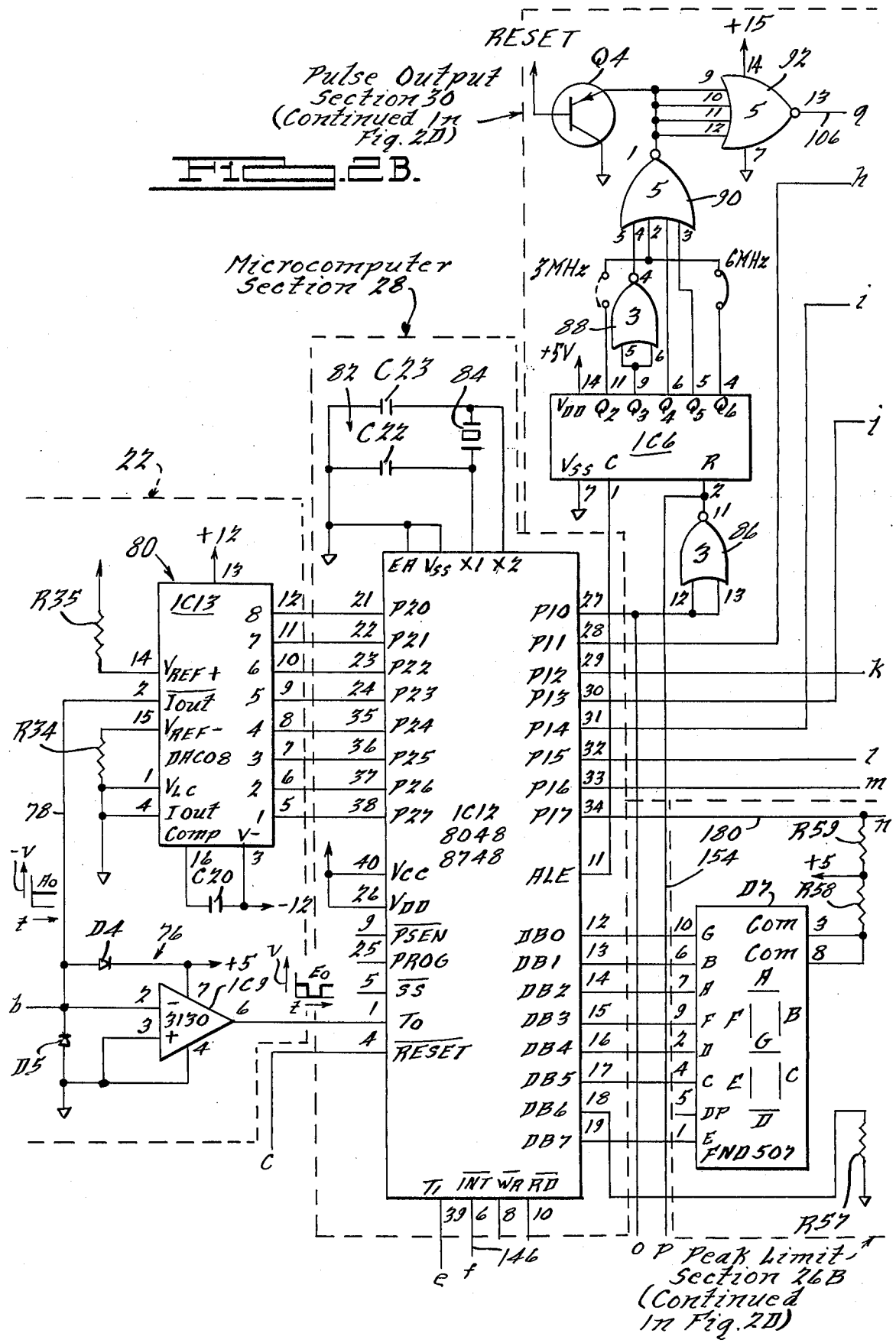

DIGITAL POWER CONVERTER TRIGGER

BACKGROUND-SUMMARY OF THE INVENTION

The present invention relates to static converters and more particularly to a trigger circuit system and method for controlling the firing angles for controlled rectifiers for converting between multiphase a-c power and d-c power and for providing a regulated output therefrom.

Many industrial systems utilize voltage and/or current converted from a-c or d-c energy. In the description which follows a conversion system from a-c to d-c is described; it should be understood that the principles are equally applicable to the reverse i.e. d-c to a-c.

Thus the d-c energy in many cases is generated from a three phase a-c input by static converters utilizing controlled rectifiers. In order to maintain a constant d-c output (voltage and/or current) and to compensate for load fluctuations, variations in a-c input voltage, etc., it is necessary to vary the phase angle at which the controlled rectifiers conduct. This is done by varying the time at which the trigger pulses, which fire the controlled rectifiers, are generated. At the same time since a three phase a-c input is used, the trigger pulses must occur in proper sequence and time for each half cycle. Thus the trigger pulses will be occurring generally sixty (60°) electrical degrees apart and six trigger pulses are required for each complete three phase cycle. Unless the timing of the trigger pulses is closely controlled d-c voltage and/or current control problems can occur. Some of the problems and proposed solutions therefor have been presented in a paper by J. D. Ainsworth, Proceeding, IEE, Vol. 114, No. 7, July 1967; another solution is presented in U.S. Pat. No. 3,648,078 to James H. Galloway, issued on Mar. 7, 1972.

In the present invention a circuit is operative with a microcomputer to control an internal (computer) counter which operates from a system clock. The internal counter is set to a number (trigger sequence number) which in a timed system is representative of the number of electrical degrees between successive pulses which will provide the desired phase angle at which firing of each controlled rectifier for the related one of the three phase inputs will occur and, with associated circuitry, is effective to provide a trigger pulse each time the sequence number is reached. This number is periodically updated and hence varied in magnitude to accommodate variations in load, etc., whereby the proper phase relationship of trigger pulses and associated line phase is provided to respond to load variations, line fluctuations, etc., in order to maintain a constant d-c (voltage and/or current) output. At the same time the sequence of occurrence of the trigger pulses is controlled to provide firing in accordance with the rotation of the phases of the three phase input.

Therefore, it is an object to provide a new and improved trigger circuit and system for controlling the firing angles for controlled rectifiers in a multi-phase static converter.

It is another object to provide such a circuit and system utilizing a circuit in which the time for occurrence of trigger pulses is determined by a predeterminable digital number and furthr in which the magnitude of the predeterminable digital number is varied to maintain the proper and desired phase relationship between trigger pulses and the associated phases of the three phase input whereby the d-c output is regulated.

Other objects, features, and advantages of the present invention will become apparent from the subsequent description and the appended claims, taken in conjunction with the accompanying drawings, in which:

FIG. 1 is a general schematic and block diagram depicting a static converter of a type which can include the trigger circuit and system of the present invention; and FIGS. 2A, 2B, 2C and 2D, together, comprise a circuit diagram of the trigger circuit and system for use in the converter of FIG. 1, with the 'a's of FIGS. 1A and 1D being connected, the 'b's and 'c's of FIGS. 1A and 1B being connected, the 'd's of FIGS. 1A and 1D being connected, the 'e's, 'f's, 'g's, 'h's, 'i's, 'j's, 'k's, 'l's, 'm's, and 'n's of FIGS. 1B and 1D being connected and the 'o's and 'p's of FIGS. 1B and 1C being connected.

Looking now to FIG. 1 a static converter 10 is shown in conjunction with a three phase source 12 of electrical energy with the three phases being designated $\phi A$, $\phi B$ and $\phi C$. Each of the phases is connected through relay contacts RCa, RCb and RCc, respectively to the input of the static converter 10. Current transformers CTa, CTb and CTc are associated with each input phase and are also connected to the static converter 10.

The static converter 10 includes a plurality of controlled rectifiers RA1 and RA2 for $\phi A$, RB1 and RB2 for $\phi B$ and RC1 and RC2 for $\phi C$ which are connected as a full bridge to provide full wave rectification of the three phase input whereby a d-c output results. The controlled rectifiers RA1,2–RC1,2 each have gate or control electrodes GA1,2–GC1,2 by which the associated rectifier can be fired in response to a trigger pulse. The trigger pulses are generated by a trigger circuit 14 which has six outputs A1,2–C1,2 each connected to one of the gates GA1,2–GC1,2. As will be seen the trigger pulses at outputs A1,2–C1,2 and hence applied to gates GA1,2–GC1,2 generally occur in sequence at intervals of sixty (60°) electrical degrees. The trigger pulses are set to be applied in accordance with the appropriate half cycle of the associated phase of the three phase input. Thus the trigger pulse at A1 and on gate GA1 will occur at a predetermined time during the occurrence of the positive half wave of $\phi A$; next the trigger pulse at B1 and on gate GB1 will occur during the occurrence of the positive half wave of $\phi B$. Thus assuming a phase rotation of $\phi A$, $\phi B$, $\phi C$ (as shown in FIG. 1) then the trigger pulses will be generated at generally sixty (60°) electrical degree intervals at outputs A1, B1, C1, A2, B2, C2 (in that order). In order to provide a return path for the rectified output of the actuated phase the controlled rectifiers for the opposite polarity of one of the two phases will also be actuated, i.e. gated.

A d-c output is generated and appears at output lines 16 and 18 via a series choke filter CF and a shunt filter capacitor FC. The circuit configuration of FIG. 1 is one usually associated with high voltage industrial applications where the voltage must be regulated. Some industrial systems require high current, i.e. plating applications; the latter systems have a configuration in which the controlled rectifiers are located in the primary of a three phase transformer and the pulsed d-c output for the load is taken at the secondary. In the high current systems, the d-c current can be regulated to maintain it constant. Thus in most industrial applications, the d-c output whether for a constant voltage or constant current application must be regulated. This is accomplished by the Trigger Circuit 14, shown in detail in FIGS. 2A–2D.

The Trigger Circuit 14 can be considered to comprise the following sections: Power Supply Section 20, Control Amplifier Section 22, Synchronization Section 24, Peak Limit Sections 26A and B, Microcomputer Section 28 and Pulse Output Section 30.

The Power Supply Section 20 provides regulated, desired operating voltages for use with the remainder of the circuitry.

The Control Amplifier Section 22 provides signals indicating the amplitude of the output d-c voltage and current for comparison to reference values whereby the d-c output can be regulated by controlling the timing of the trigger pulses.

The Synchronization Section 24 provides an indication of the phase sequence of the three phase a-c source, i.e. $\phi A$, $\phi B$ and $\phi C$ in order to permit the proper determination of the sequence of the associated trigger pulses at A1,2–C1,2 (see FIG. 1) and also provides an indication of the electrical degree position of a selected phase, i.e. $\phi A$. Thus the time of occurrence of each phase can be determined as well as the sequence thereof.

The Peak Limit Sections 26A and 26B are provided to protect the system and shut it down in the event of sensed overload and/or fault conditions.

The Microcomputer Section 28 provides the overall control function whereby the necessary phase corrections can be made to the trigger pulses at A1,2–C1,2 whereby the d-c output voltage and/or current will be regulated. The Microcomputer Section 28 has an internal counter, i.e. within microcomputer circuit, which controls the occurrence of successive trigger pulses. The timing of the trigger pulses is related to a numerical value (trigger sequence number) set in the internal counter and which numerical value provides the proper phase relationship of the trigger pulses at A1,A2–C1,C2 for the associated line phase ($\phi A$, $\phi B$, $\phi C$); these values are in a sense, continuously monitored and are modified as required to provide proper phasing of the trigger pulses whereby firing of the controlled rectifiers RA1,-RA2–RC1,RC2 will be controlled such that the d-c output voltage and/or current will be regulated.

The Pulse Output Section 30 has an external counter which functions to provide a plurality of pulses which are operative with the output from the microcomputer to provide the trigger pulses as a plurality of relatively high frequency pulses in order to enhance firing at lower gate input power. The Pulse Output Section 30 has the necessary logic elements to respond both to the output from the microcomputer and the external counter.

In the description which follows many conventional circuit components (in the form of integrated circuits, etc.) are shown and identified by their known designation. While the drawings depict numerous standard connections to the various pin connections, for purposes of simplicity, these have not all been described in detail.

THE POWER SUPPLY SECTION 20

The Power Supply Section 20 operates from a 50 volt a-c supply (which can be obtained from one of the phases $\phi A$–$\phi C$) via a center tapped transformer (not shown). The 50 volt a-c input is connected from opposite sides of the transformer to a bridge DB1 via input lines 34 and 36. The center tap is connected to the Section 20 via a line 38 which acts as a common or system ground. The bridge DB1 provides full wave rectification in a conventional manner resulting in a d-c output with the positive side at conductor 40 and the negative side at conductor 42. A filtering and regulating circuit 44 is connected across conductors 40 and 42 and operates to provide +12 volts and −12 volts d-c at output conductors 46 and 48, respectively. In the remainder of the schematic the designation +12 v or −12 v indicates a connection to this source at conductors 40 and 42. Likewise the designation "common" or the open triangle symbol indicates a connection to conductor 38, i.e. system ground.

The filtering and regulating circuit 44 comprises a network having capacitors C1 and C2 and a blocking diode D1 connected between plus lines 40 and common 38. A dropping resistor R1 and zener diode D2 are connected across capacitor C2 with the +12 v output conductor 46 being connected to the juncture of resistor R1 and zener D2. A filter capacitor C4 is connected from conductor 46 to common 38. In a similar manner capacitor C3 is connected across the negative line 42 and common 38 with a dropping resistor R2 and zener diode D3 serially connected across capacitor C3. The −12 v conductor 48 is connected at the juncture of resistor R2 and zener D3 and is also connected to common 38 via a filter capacitor C5.

In addition to the +12 and −12 volts d-c supplied, the Power Supply Section 20 provides a well regulated +5 volt d-c supply which is used both as an operating voltage for other portions of the circuitry and also as a voltage source for the generation of reference voltages having a predetermined magnitude less than +5 volts. Thus a filtering and regulating circuit 50 is connected across the plus d-c line 40 and common 38 and includes a 723 voltage regulator chip IC17. IC17 has a variable voltage divider network comprising serially connected fixed resistors R3 and R4 and potentiometer P1 connected from its VR input to common 38. A movable tap 52 on potentiometer P1 is connected to the NI input of IC17 while its V− terminal is connected to common 38; likewise the C terminal is connected to common 38 via capacitor C6. The V+ and VC terminals of IC17 are connected to common 38; likewise the C terminal is connected to common 38 via capacitor C6. The V+ and VC terminals of IC17 are connected to the positive conductor 40 (via diode D1). An n-p-n transistor Q1 and p-n-p transistor Q2 and the associated circuitry cooperate with IC17 to provide a regulated +5 volt d-c output at conductor 54 from terminal I of IC17 via a resistor R5. Conductor 54 is also connected to the Cs terminal of IC17. Thus the base electrodes of Q1 and Q2 are connected together and connected to the Vo terminal of IC17 and to common 38 via resistor R6. The collector of Q1 is connected to plus line 40 (via diode D1) and to one end of a resistor network including parallely connected resistors R10, R11 and R12. The opposite side of that resistor network is connected to the emitter of Q1 with that emitter connected to conductor 54 via resistor R7. The Q1 emitter is also connected to common 38 via serially connected resistors R8 and R9 with IC17 terminal CL connected to the juncture of R8 and R9. The emitter of Q2 is connected to conductor 54 with a pair of parallely connected filter capacitors C7 and C8 connected therefrom to common 38. The collector of Q2 is also connected to common 38.

In operation, the tap 52 of potentiometer P1 can be varied to set the d-c voltage at conductor 54 to the desired magnitude, which in the case shown is +5 volts d-c.

As will be seen the +12 and −12 volt d-c and +5 volt d-c generated by the Power Supply Section 20 is used throughout the remainder of the circuitry. In the remainder of the schematic the designation of +5 v designates a connection to conductor 54.

CONTROL AMPLIFIER SECTION 22

As indicated it is desirable that the converter 10 provide a constant d-c voltage output (or constant d-c current output if the current configuration is used). However, certain factors are operative which tend to vary the magnitude of that d-c voltage (and/or current). To compensate for these factors the magnitudes of both the d-c voltage and current at output lines 16 and 18 are sensed and utilized to vary the phase angle of occurrence of the trigger pulses to maintain the d-c output voltage (and/or current) constant.

Looking now to the Amplifier Section 22 various inputs are shown for a voltage control circuit 56 and a current control circuit 58.

The voltage control circuit 56 has inputs labeled as Current Density, $V_{REF}$, $-V_F$ and $+V_F$.

The Current Density input receives an input voltage (to be described) which has an amplitude indicative of the amplitude of the output d-c current at converter conductors 16 and 18. The purpose of the Current Density input is to provide an indication of current and changes in current whereby the necessary change in phase angle of firing of controlled rectifiers RA1,-RA2–RC1,RC2 can be effected to compensate for voltage drops at the load itself caused by the current, i.e. especially when the load is somewhat remote from the source of d-c voltage and relatively high currents will cause a reduction in voltage at the load.

The $V_{REF}$ input receives a reference voltage of a preselected amplitude, with the amplitude selected to represent the desired amplitude of d-c voltage at the output lines 16 and 18. This is accomplished via a potentiometer P5 having its movable arm 60 connected to $V_{REF}$. P5 is connected to the regulated +5 volt supply and is varied by the operator system controller to the level to provide the desired voltage output at lines 16 and 18.

The $+V_F$ and $-V_F$ inputs receive a voltage indicative of the amplitude of the potential across conductors 16 and 18. This amplitude is scaled down to a desired level via potentiometer P6 and movable arm 62.

The voltages from $-V_F$ and $+V_F$ and the $V_{REF}$ voltages are compared on a 3130 operational amplifier IC7 with an output at conductor 64 providing an amplified indication of the difference between the desired reference and the actual d-c voltage. The reference voltage at $V_{REF}$ is modified by the voltage at the Current Density input whereby the reference voltage will vary with changes in d-c current magnitude whereby changes in d-c output voltage (at conductors 16 and 18) can be made to accommodate anticipated line drop at the load. Note that the effect of the Current Density input is small compared to the sensed voltage effect.

The voltage across $-V_F$ and $+V_F$ is connected across a variable voltage divider network which comprises a fixed resistor R18 serially connected to a potentiometer P2.

The movable arm of P2, the $V_{REF}$ and Current Density inputs are connected to an additional circuit made up of resistors R13, R14 and R14a which are all connected together to the negative input of IC7. A filter capacitor C29 connects the positive and negative inputs of IC7. The positive input of IC7 receives an input from $+V_F$ via dropping resistor R14a which operated in conjunction with a pair of parallely connected resistors R13b and R14b which are connected from the positive input of IC7 to common 38. The positive input of IC7 also receives a +5 volt input from conductor 54 via a dropping resistor R13c and a filter capacitor C11.

A feedback circuit comprised of parallel connected resistor R13d and capacitor C9 is connected from the output of IC7 to its negative input.

The output at conductor 64 provides a signal having a magnitude which indicates the difference in amplitude between a desired preselected voltage amplitude and the actual amplitude of the d-c output voltage across conductors 16 and 18. When that d-c voltage is at the desired amplitude then the signal Vo at conductor 64 will be at a desired amplitude. If the d-c voltage output is more or less than the desired amplitude then the signal Vo will indicate the same by its change in amplitude. In order to better control the d-c voltage output, an indication of load current and changes in d-c voltage in response thereto can be beneficial in controlling the d-c output voltage. This is accomplished by the current control circuit 58 which operates in conjunction with the voltage control circuit 56 in a manner to be described. This circuit has inputs labeled $I_{REF}$, $I_F$, $I_{FB}$, −50 mv and +50 mv. The input $I_{REF}$ provides a reference voltage indicative of a selected reference amplitude of output d-c current (at lines 16, 18); this reference voltage is secured from the +5 volt line 54 and can be scaled down to the desired amplitude via potentiometer P7 and movable arm 66.

The $I_F$ input is a voltage having a magnitude related to the actual d-c load current in lines 16, 18.

Thus the current related voltages at $I_{REF}$ and $I_F$ are compared via a 3130 operational amplifier IC8. The input at $I_{REF}$ is connected to the negative input of IC8 via dropping resistor R14c. The positive input of IC8 receives the input at $I_F$ via a dropping resistor R14d; it also receives the +5 volts from line 54 via a parallel circuit comprised of resistor R13e and capacitor C14. The output of IC8 is connected to line 64 with the output also connected to its negative input via a feedback circuit comprising a parallel connected resistor R13f and capacitor C13.

Thus the output of the current control circuit 58 appears at conductor 64 with a magnitude varying in accordance with variations in the magnitude of the d-c line current (at conductors 16, 18) relative to a preselected reference of line current. If the line current varies from a preselected level (reference level at $I_{REF}$) then the current control circuit will be operative to provide an output signal Io from IC8 having a magnitude indicative of the difference between actual load current and the reference current.

It is desirable to have only one signal, i.e. either from the voltage control circuit 56 (Vo) or from the current control circuit 58 (Io) to affect the phase angle of the trigger pulses. Thus a disabling line 68 is connected between IC7 and IC8 (i.e. their respective pin 8's and their respective pin 1's via capacitors C10 and C13) whereby that control circuit having the highest amplitude output will control and will disable the other. Thus only the signal Vo or Io will appear at conductor 64. In a constant voltage application the $I_{REF}$ and $V_{REF}$ can be set via P7 and P5 to provide control mainly by the voltage control circuit 56 whereby the d-c output voltage will be predominantly regulated. In a high constant current application the $V_{REF}$ and $I_{REF}$ can be set via P5 and P7 to provide control mainly by the current control circuit 58 whereby the d-c output current will be predominantly regulated. Thus for a constant voltage application, in a condition in which the d-c output voltage at lines 16 and 18 is of the desired amplitude and the d-c current is below a predetermined amplitude only a signal Vo will appear and will be of an amplitude to maintain the phase angle of firing the same. In the event the d-c output voltage begins to drop, the signal Vo will change accordingly to provide the necessary change in phase; however, if the current amplitude in either circumstance exceeds a predetermined high then signal Io, if greater than Vo, will control to affect the necessary phase change. The converse will be true for a constant current application.

The load current signal at $I_F$ and at the Current Density inputs are obtained via a load current circuit 70. The load current circuit 70 has a +50 millivolt input and a −50 mv input which provide indications of the magnitude of load current in lines 16 and 18, respectively. This indication of magnitude of load current is amplified via a 741 amplifier IC10. The input at −50 mv is connected to the negative input of IC10 via resistor R21 while the input at +50 mv is connected to the positive input via resistor R22. The positive and negative inputs are connected together via a filter capacitor C18 with the positive input also connected to common 38 via a parallely connected resistor R14 of a capacitor C16.

The resultant output from IC10 appears at output conductor 72 and is connected to the negative input via a feedback network comprised of parallely connected resistor R14h and capacitor C15. The amplification level can be selected via a potentiometer P3 and movable arm 74. The arm 74 is connected to the −12 volt d-c line 48 while the resistive part of P3 is connected across pins 1 and 5 of IC10.

The output at line 70, which is an indication of the magnitude of the load current (at lines 16, 18), and at terminal $I_{FB}$ is connected therefrom to terminal $I_F$ and to the Current Density terminal via potentiometer P8 and movable arm 71.

The output signal at line 64 is connected to a comparator circuit 76 via a dropping resistor R33. Comparator circuit 76 includes a 3130 operational amplifier IC9 which has its positive input connected to common 38. The signal at resistor R33 is connected to the negative input of IC9; this input also receives an analog signal Ao via a line 78 from an digital to analog converter circuit 80. The signal Ao is of negative polarity and hence if Ao and the resultant of signals Vo or Io (across R33) are equal then there will be a zero input at IC9 and IC9 will be placed in its low output condition, i.e. the same as if Ao exceeded Vo. Conversely when Vo exceeds Ao IC9 will be placed in its high output condition. The resultant high-low output at IC9 is an error test signal Eo. As will be seen even if the existing phase relationship is appropriate to provide the desired d-c output voltage level, the connected circuitry will still test signal Eo for error in a manner which will result in only a minor change in phase shift if any. A diode D5 is connected from the negative input of IC9 to ground. A diode D4 is connected from pin 7 of IC9 and the +5 volt line 54 to the negative input of IC9.

Thus IC9 will have an output error test signal Eo which will change state from high to low to indicate the direction of change to be made in the trigger sequence number (and hence phase angle) in the generation of the trigger pulses.

Thus digital to analog circuit 80 includes a DAC08 digital to analog converter IC13 with the signal Ao at line 78 being generated at inverse output, I out (bar), from IC13. The d/a converter IC13 receives a digital input (from Microcomputer Section 28) and provides the analog signal Ao which operates with the comparator IC9 such that, with a routine in the microcomputer IC12, there will be provided in IC12 an analog to digital conversion of the magnitude of signal Vo. The digital input or count from IC12 is received at pins 5–12 and is converted to an analog signal at inverted I out (bar). The d/a converter IC13 has its V+ pin connected to the +12 volt supply and its $V_{REF}+$ connected to the +5 volt supply via resistor R35. The IC13 $V_{REF}+$ is connected to common 38 via resistor R34 while its $V_{LC}$ and I out are connected directly to common 38. The COMP terminal of IC13 is connected to the −12 volt supply via capacitor C20 while its V− input is connected directly thereto.

MICROCOMPUTER SECTION 28

The Microcomputer Section 28 includes a clock 82 and an 8048 or 8748 microcomputer IC12. The clock 82 has an oscillator type crystal 84 connected at opposite ends to capacitors C22 and C23 which in turn have one end connected to common 38. The crystal 84 can be selected to provide a frequency of 3 or 6 megahertz.

In operation the microcomputer IC12 receives the output of clock 82 at its inputs X1 and X2 while its terminals EA and Vss are connected to common 38. The clock pulses are utilized internally in the microcomputer IC12 (in a manner to be seen) by an internal counter to provide a numerical indication of the firing angle or phase angle. Note that the pulses from clock 82 are appropriately divided by conventional means to provide desired operating frequencies. The microcomputer IC12 is programmed to to provide a train of signals which are spaced sixty (60°) degrees apart and include an adjustment for the phase angle at which each of the controlled rectifiers (RA1,-RA2-RC1,RC2) is to be fired, i.e. when each trigger pulse is to be generated. This information in the form of a trigger sequence number is predetermined at start up generally to provide the sixty (60°) degree spacing. This information is stored as a binary number and is adjusted to control required changes in the phase angle to provide the desired regulation, i.e. voltage and/or current. At the same time a base number is stored having a magnitude which, if transmitted to the d/a converter IC13, would result in an analog output signal Ao having a magnitude equal to that magnitude Vo would attain if the desired d-c output voltage level were attained. The microprocessor IC12 will operate in response to the high or low condition of error test signal Eo and, hence, by a subroutine of successive approximation, digital numbers are transmitted to d/a converter IC13 until a digital approximation of Vo is reached. As noted IC13 has already stored the base number which is a digital representation of the magnitude of Vo when the desired output voltage is attained. Thus the difference between the digitally determined Vo number and the base number will be an error number which is used to vary the trigger sequence number. This is accomplished by the connection of outputs P20–P27 of microcomputer IC12 to pins 5–12 of d/a converter IC13. Thus the error test signal Eo will be generated from a comparison between Ao and the resultant Vo or Io signals and the error test signal Eo will be transmitted to the To input of microcomputer IC12 which will then operate upon that error signal to modify the trigger sequence number upwardly or downwardly as required. As will be seen, the error test signal Eo is recognized by the microcomputer IC12 and will be tested to determine the validity of the trigger sequence number and if necessary to determine the error number whereby a new trigger sequence number can be determined. In order to coordinate the trigger sequence number with the occurrence of the appropriate phase, i.e. $\phi A$, $\phi B$, $\phi C$, information from two phases, e.g. $\phi A$ and $\phi B$, is fed to the microcomputer IC12 at inputs T1 and INT (bar). These inputs indicate the occurrence of $\phi A$ from which the pulse train may be initiated upon start up and also indicates the occurrence of $\phi B$ whereby the sequence of the phases can be determined.

In operation then, the microcomputer IC12 is programmed to provide a plurality or train of six signals respectively at outputs P11–P17 in a selected sequence. This sequence provides the necessary signals at sixty electrical degrees (60°) apart which is the spacing between consecutive positive and negative half cycles of the three phases (see FIG. 1). The signals at P11–P17 are relatively wide in width and provide a window which covers a range in which the desired trigger pulses will occur. The microcomputer IC12 monitors an internal counter and when the count reaches a predetermined trigger sequence number indicative of the desired time between pulses for firing, the window or pulse in which firing can occur is generated. As will be seen the devices for generating the trigger pulses require the coincidence of a second enabling signal with the window signal for providing the trigger pulses. This is supplied by a relatively high frequency source, i.e. counter IC6, which is operative to provide a plurality of pulses in the window pulse to permit a repetitive trigger pulse to be generated. As previously noted, this permits the use of relatively low power trigger or gate pulses. Thus, when the pulses of relatively high frequency occur within the window for a particular phase and polarity of that phase, a trigger pulse (in the form of a plurality of pulses of that same high frequency) will be generated to the appropriate gate GA1,GA2–GC1,GC2 whereby the associated controlled rectifier GA1,-GA2–GC1,GC2 will fire. The occurrence of the window pulse however, will be varied depending upon the phase conditions required to maintain the d-c output voltage and/or current constant. Note that in order to provide a return path for the actuated phase. e.g. positive of $\phi A$, the controlled rectifier for one of the phases of opposite polarity, i.e. negative of $\phi B$ or $\phi C$, will be actuated.

The Vcc and Vdd inputs of microcomputer IC12 are connected to the +5 volt supply.

The above description can be further understood from a description of the Pulse Output Section 30 and Synchronization Section 24.

PULSE OUTPUT SECTION 30

As noted the microcomputer IC12 functions in conjunction with a 4024 counter IC6. The counter IC6 has its VDD input connected to the +5 volt source while its Vss terminal is connected to common line 38. The clock pulses from clock 82 are transmitted (after appropriate division to bring it to a frequency compatible with IC6) to input C of counter IC6 via terminal ALE of microcomputer IC12. The counter IC6 is set to a predetermined number and will provide an output pulse upon attainment of that number and will repeat the cycle. Thus counter IC6 acts as a frequency dividing network. The repetition rate is higher than the frequency of the window pulses from microcomputer IC12 whereby a preselected plurality of signals will be provided from counter IC6 for each window pulse. The counter IC6 will be reset (for start up purposes) by a reset signal from microcomputer IC12 via terminal P10 and NOR gate 86 (having its inputs connected together to function as an inverter). The output of NOR gate 86 is connected to input R of counter IC6. The output signal from counter IC6 appears at its output terminals Q2–Q6. The reset signal is time coordinated with the window pulse to assure that the counter pulses will occur at the desired time relative to the window pulse.

Only one of the counter outputs Q2 or Q6 will be used depending upon whether the clock is functioning at 3 MHz or 6 MHz, respectively. The Q3 output is connected to NOR gate 88 (having its inputs connected together and hence functioning as an inverter). The output of NOR gate 88 is connected to one input of multiple input NOR gate 90. Another input to NOR gate 90 is connected to IC6 counter outputs Q2 or Q6 while two other inputs are connected to IC6 counter outputs Q4 and Q5.

The output from NOR gate 90 is connected to NOR gate 92 having its inputs connected together for functioning as an inverter. A p-n-p transistor Q4 has its base connected to a RESET conductor 94 while its collector is connected to common conductor 38. The emitter of Q4 is connected to the common input of NOR gate 92. As will be seen, transistor Q4 functions to provide a disabling signal such that in the event of a sensed overload or fault condition the system will be disabled whereby the generation of trigger pulses A1–C2 to gates GA1–GC2 will be stopped.

The output from NOR gate 92 is connected to one of the inputs of six NOR gates 94–104 via conductor 106. The six NOR gates 94–104 are associated with one of the six gates GA1–GC2, and are operative to provide the necessary trigger pulses to the associated one.

The second inputs of the six NOR gates 94–104 are separately connected to the six output terminals P11–P16 of microcomputer IC12 terminals and appropriately actuated in a sequence of sixty degree intervals. As previously discussed when the appropriate window signal from the microcomputer IC12 appears at the input of the appropriate NOR gates 94–104 then the higher frequency pulses resulting from counter IC6 and appearing at conductor 106 will actuate those of the NOR gates 94–104 to provide the trigger pulses to the associated gates GA1–GC2. Since the initiation of the window signals at outputs P11–P16 occur sixty (60°) electrical degrees apart only one of NOR gates 94–104 will be actuated at any one time for the active, rectified phase while one other will be actuated to provide a return path. In contrast note that the counter IC6 will be effective to provide its high frequency signal during the window pulses and this signal will appear simultaneously at one input of each of the NOR gates 94–104.

Each of the NOR gates 94–104 (part of unitary packages marked '3' or '4') receives +5 volts from a connection with Power Supply Section 20 and has a connection to common conductor 38. In a like manner the NOR gates 90 and 92 (marked '5') have similar connections.

The outputs of NOR gates 94-104 are similarly connected to parallel circuits 94a-104a including power driver inverters 108-130 and resistors R38-R46. Parallel circuits 96a, 100a, and 104a have light emitting diodes D17, D18 and D19, respectively, connected in one leg thereof to provide a visual indication of operability of trigger pulses for each phase. The outputs from parallel circuits 94a-104a are the trigger pulses to gates GA-1-GC2, respectively, via conductors A1,A2-C1,C2 respectively (see FIG. 1).

The power drivers 108-130 are in common packages 132 (shown in dashed lines) which are typically connected to necessary operating voltages and hence as shown the inverters 108-130 via connections to the packages 132 are connected to the plus line 40, to common line 38 and are also connected to line 38 via parallelly connected capacitors C24 and C28 which in turn have one side connected to the common line 38.

The return lines from gates GA1-GC3 are via connections to the COM-A, COM-B and COM-C terminals which are protected via fuses F1, F2 and F3, respectively.

As previously noted the microcomputer IC12 requires the information regarding two phases in order to properly synchronize the generation of the desired trigger pulses in coincidence with the phase rotation at the source. This information is provided via the Synchronization Section 24.

THE SYNCHRONIZATION SECTION 24

Looking now to FIG. 2C the Synchronization Section 24 is shown connected to the $\phi A$, $\phi B$ and Neutral lines of the three phase input source via conductors 134, 136 and 138, respectively, through step down transformers (not shown) or alternatively through dropping resistors (also not shown). The high input voltages at $\phi A$ and $\phi B$ are isolated from the remainder of the circuitry via optical isolators IC15 and IC16, respectively.

The $\phi A$ voltage at conductor 134 is connected to IC15 via resistors R55 and R54 with a filter capacitor C26 connected therebetween to Neutral 138. A diode D8 connected from R54 to Neutral 138 shunts out one half cycle of the $\phi A$ input while the other half cycle energizes LED15 (light emitting diode) of isolator IC15. Photoresponsive member PR15 of IC15 is operative with LED15 to provide an output at conductor 140 when LED15 is energized by $\phi A$. The output at conductor 140 will vary in magnitude in accordance with variations in magnitude of the $\phi A$ voltage. The output at conductor 140 is connected to common line 38 via dropping resistor R52. In a similar manner $\phi B$ is connected to optical isolator IC16 via resistor R56 with a diode D9 connected between R56 and Neutral 138 to shunt one half cycle of the $\phi B$ input. Isolator IC16 has LED16 and photoresponsive member PR16 which functions similarly to LED15 and PR15 as previously discussed. PR16 is operative to provide at one electrode an output at conductor 142 when LED16 is energized by $\phi B$. As with conductor 140, the output at conductor 142 will vary with the $\phi B$ voltage. The other electrode of PR16 is connected to common 38.

The +5 volt supply is connected directly to one electrode of PR15 and to one electrode of PR16 via dropping resistor R51.

The signal at conductor 140 is connected to the input of NAND gate 144 (which has both inputs connected together to function as an inverter). The output via conductor 146 from NAND gate 144 is connected to the INT (bar) input of microcomputer IC12. This indicates the presence of $\phi A$. Note that NAND gate 144 operates as a Schmitt trigger and has a predetermined hysteresis type output. Thus when the signal at line 140 attains a preselected amplitude the gate 144 will be switched 'on'; it will be switched 'off' when the input voltage drops to a preselected amplitude less than the switch 'on' voltage, e.g. 0.6v difference. Thus the gate 144 will be actuated during the rise of the sine wave signal at line 140 and will be abruptly deactuated to zero during its decline when it attains the predetermined low value, (see point x, FIG. 2C). This abrupt switch can be readily detected and will occur at a relatively predictable position on $\phi A$. In order to prevent the trigger pulses for a phase from being shifted outside of the 0°-180° range (for the + half cycle) end stops effective for each half cycle are provided. The necessary stop limits for $\phi A$ trigger pulses (which will similarly effect the other phases) can be made from the predictable $\phi A$ position.

The proper sequence of rotation of $\phi B$ and $\phi C$ relative to $\phi A$ must be determined and is determined using the $\phi A$ and $\phi B$ signals to IC12.

The $\phi B$ signal at conductor 142 will control the input to the T1 input of microcomputer IC12. The $\phi B$ signal to the T1 input of microcomputer IC12 will provide sufficient information to determine the electrical degrees of separation between $\phi A$ and $\phi B$ such that IC12 can determine whether the proper sequence is $\phi A$-$\phi B$-$\phi C$ or $\phi A$-$\phi C$-$\phi B$ and hence will set the order of signals out from outputs P11-P16 to NOR gates 94-104 accordingly.

Thus the $\phi B$ signal from isolator IC16 at conductor 142 is connected to one input of a NAND gate 148 via dropping resistor R53 which resistor is connected to common line 38 via filter capacitor C25. The other input of NAND gate 148 is connected to reset output P10 of microcomputer IC12. Thus NAND gate 148 will produce an output in the absence of an output at either P10 or conductor 142. Thus microcomputer IC12 via the output from P10 can provide a disabling signal precluding a signal at T1. Without the appropriate signal at T1 (and INT (bar)) the microcomputer IC12 will not produce the necessary window pulse and the system will be shut down.

The output of NAND gate 148 is connected to one input of NAND gate 150; the other input of NAND gate 150 is connected to the output of NAND gate 152.

One input of NAND GATE 152 is connected via conductor 154 to the output of NOR gate 86 of Pulse Output Section 30 while the other output of NAND gate 152 is connected to the +5 volt source via dropping resistor R32 and to the LOCKOUT terminal via conductor 156. Thus a reset signal at NOR gate 86 or a lockout signal from LOCKOUT line 156 will also preclude a $\phi B$ signal from appearing at T1.

Since the microcomputer IC12 requires the presence of signals at both its T1 and INT (bar) inputs it can be seen that the trigger pulses at A1-C2 will be generated only in the presence of $\phi A$ and $\phi B$ signals as applied thereto. The LOCKOUT signal provides an external, manual means for the system operator to shut the system down.

The NAND gates 144–152 are in a unitary package and are connected to the +5 volt source and common line 38 as shown. All are of the Schmitt trigger type described in conjunction with NAND gate 144.

Thus the synchronization signals at inputs T1 and INT (bar) provide the microcomputer IC12 with the information necessary to initiate firing from the correct point of the phases φA, φB or φC and to do so in the correct sequence of phase rotation.

The system can be interrupted in the event of a detected fault or overload. This is accomplished by the Peak Limit Sections 26A and 26B.

THE PEAK LIMIT SECTION 26A AND 26B

Looking now to FIG. 2A, in the Peak Limit Section 26A, the current transformers CTa, CTb and CTc (FIG. 1) each have one side connected to input lines 160, 162 and 164, respectively, while the other sides are connected to a common connection 166. The current from the d-c source is sensed in order to detect the occurrence of faults on the d-c side of converter 10 as well as other possible faults.

The Peak Limit Section 26A monitors the main line current via the current transformer (CTa–CTc) and compares that magnitude to a selected reference for that particular converter and will disable the system when a current in excess of the reference is encountered.

Thus the a-c current at input lines 160, 162 and 164 is full wave rectified via diodes D10–D15 and the resultant voltage applied across a resistive bridge 168 via conductors 170 and 172 and common line 166. The bridge 168 is comprised of four equally valued dropping resistors R28–R31. The result is a positive d-c voltage at conductor 170 with conductor 172 being connected to the common line 38.

The voltage at line 170 is connected to the plus input of a 3130 operational amplifier IC11 via a dropping resistor R24. A filter capacitor C17 is connected between conductors 170 and 172.

The negative input of amplifier IC11 is connected to a reference voltage circuit 170 and to conductor 172 (common) via dropping resistor R25. The reference voltage circuit 170 includes a parallel set of switches SW1–SW4 and associated resistors R15, R16, R17 and R19. The parallel circuit is connected between the +12 volt supply and the negative input of IC11. Note that the resistors R15, R16, R17 and R19 when placed in the circuit from a voltage divider network with R25. Each of the resistors R15, R16, R17 and R19 are of different values and hence the closing of the appropriate switch or switches (SW1–SW4) will provide the disired reference voltage for the converter.

The output of IC11 is transmitted via dropping resistor R26 to the base of n-p-n power transistor Q3. The base is connected to the +5 volt supply via a charge capacitor C30 and to common line 38 via a blocking diode D16. The emitter of Q3 is connected to common line 38 while its collector is connected to a RESET (bar) input of microcomputer IC12 via conductor 172. It is also connected to the base of transistor Q4 via line 173 whereby the trigger generating NOR gates 94–104 will be disabled. The collector of Q3 is connected to common line 38 via filter capacitor C19. Upon the occurrence of a fault or overload as detected a signal will be generated from transistor Q3 to RESET (bar) input. The microcomputer IC12 will respond to this signal to shut the system down and to start it again, i.e. reset the system. If the sensed overload or fault was only a transient then the system will be restarted and continue. If, however, the overload or fault continues then the system will be permanently shut down. This latter function is performed by the Peak Limit Section 26B.

The microcomputer IC12 monitors the occurrence of reset signals. When a selected number of such signals over a predetermined time period occurs, then the microcomputer IC12 is effective to provide a shut down signal to permanently disable the system requiring manual reinitiation. This shut down is accomplished by a signal out from output terminal P17 of IC12. This signal is transmitted to relay interrupt coils 178a, 178b and 178c connected across conductors 174 and 178. The coils 178a–178c are associated with relay contacts RCa–RCc, respectively, and operate to open the contacts when energized.

Thus terminal P17 of IC12 is connected via a conductor 180 to a parallel circuit 182 comprising power drivers 184 and 186 and resistors R49 and R48. The output of that circuit 182 is connected to the coils 178a–178c via conductor 188. A light emitting diode (LED) D6 with a resistor R50 is connected across conductors 174 and 176 and provides a visual indication that the system has been shut down.

Note that inverters 184 and 186 are part of the same package 132 as inverters 108–130.

A FND507 digital read out D7 is connected to the microcomputer IC12 via connections between IC12 outputs DB0–DB5 and DB7 and terminals G, B, A, F, D, C and E, respectively. A terminal DB6 of IC12 is connected to common line 38 via a dropping resistor R57. The digital read out D7 has its COM terminals connected together and connected to the +5 volt supply via a dropping resistor R58. At the same time the disable output from IC12 terminal P17 is connected to the COM inputs of D7 via resistors R59 and R58. Thus the digital read out D7 will provide a display (as at FGB and EDC) indicating the status of the converter.

In summary then the system and circuit of FIGS. 1 and 2A–2D function to regulate the d-c voltage and/or current output.

As noted the voltage control circuit 56 and current control circuit 58 are preset by the system operator such that when the d-c output voltage is at a preselected level at which the voltage is desired to be maintained an output voltage Vo of a predetermined magnitude will be generated. The magnitude of voltage Vo will vary as the output voltage varies from the preselected level. The current control circuit 58 can override the signal Vo with a signal Io where the d-c output current exceeds a predetermined level. As noted in a constant current system just the opposite will occur. Thus one signal Vo or Io will appear at the comparator circuit 76. Thus for a voltage regulating application the voltage Vo will have a determinable magnitude indicating that the d-c output voltage is at the desired amplitude. When the d-c output voltage varies from the desired amplitude the voltage Vo will change in amplitude (up or down) indicating that a correction in phase angle is required.

In the meantime, by virtue of microcomputer IC12, a base number has been selected which is related to the desired output voltage (and hence ideal magnitude of Vo) at which the trigger pulses for firing the controlled rectifiers RA1,RA2-RC1, RC2 has been set. At the same time the trigger sequence number has been selected and is based upon the frequency of the system clock 82 and the frequency of the three phase source and represents the appropriate number of electrical degrees, i.e. normally 60°, for firings between phases.

In first starting the system, the time period for sixteen cycles is digitally measured via the occurrences of point x for the $\phi A$ input. From that measured interval the interval for sixty (60°) electrical degrees is determined and set as the initial trigger sequence number. After this latter number has been set the system is now actuated and trigger pulses for each phase $\phi A$, $\phi B$, and $\phi C$ are generated at a time based upon the occurrence of point x in the $\phi A$ cycle with the spacing for sixty degrees being determined by the initial trigger sequence number.

The result will be a relatively low d-c voltage output and hence Vo will have a magnitude indicating the need for the necessary change. After the occurrence of a trigger pulse the microcomputer IC12 will enter into the subroutine of successive approximation, whereby an error number is determined. From this error number the pulse sequence number is modified to increase or decrease the time for the next pulse as required by the error number. This will result in a change in spacing between trigger pulses and hence will result in a change in phase. This sequence will continue after each trigger pulse until the output voltage increases and the Ao and Vo values are proximate to each other and at the desired magnitude. At this point the error number will be zero and the trigger sequence number will be restored to its original value whereby the spacing between trigger pulses will be sixty (60°) electrical degrees. Since error test signal Eo will always be high or low and detected as such by the microcomputer IC12 the system will continuously be in at least some minor stage of adjustment.

The x point is used to determine the first (0°) zero crossing and together therewith define end stops. The microcomputer IC12 precludes the trigger pulses from moving significantly past either of these end stops and will provide an immediate correction in the phase sequence number when the trigger pulses reach or exceed either end stop. The microcomputer IC12 will determine violation of either end stop by looking to the time occurrence for trigger pulses for associated phases and by determining the relative position of successive ones of these time occurrences relative to the x point. The end stop determination is made only relative to the trigger pulse for $\phi A$, i.e. A1 of FIG. 1. Any necessary correction to the trigger sequence number will affect the firing of the trigger pulses for the other phase as well. Thus IC12 will look to the time of occurrence of selected ones of the trigger pulses A2, B1, B2, C1 and C2 relative to the $\phi A$ end stops to determine whether there is a violation and correction should be made. The correction is an abrupt predetermined number change made in the pulse sequence number. As previously noted there is provided to IC12 an indication of $\phi B$ by which the appropriate phase rotation is determined. This is done by digitally timing the interval between $\phi A$ and $\phi B$ occurrences. If the interval is less than a predetermined interval then it is known that the phase rotation is $\phi A$-$\phi B$-$\phi C$; if the interval is greater than the predetermined interval then the phase rotation is $\phi A$-$\phi C$-$\phi B$.

With this information the microcomputer IC12 is prepared to provide the trigger pulses to each of the phases $\phi A$, $\phi B$, $\phi C$ and in the proper sequence. To this end IC12 provides a succession of pulses each generally sixty (60°) electrical degrees apart and each having a phase relationship with the appropriate one of the phases $\phi A$, $\phi B$ and $\phi C$ in accordance with the trigger sequence number.

After initiation of the cycle, i.e. generating the trigger pulses once for each of the phases $\phi A$, $\phi B$ and $\phi C$, the trigger sequence number will be modified as required to provide the necessary phase angle correction whereby the desired output voltage will be attained.

In one form of the invention the various components noted have the following values:

| Resistors | Ohms |
|---|---|
| R1, R2, R5 | 680 |
| R3 | 820 |
| R4, R56 | 2.2K |
| R6, R10, R11, R12, R24, R54, R55, R57 | 1K |
| R7 | 10 |
| R8 | 2.7K |
| R9 | 5.6K |
| R13, R13b | 340K |
| R14, R14a, R14a', R14b, R14c, R14d, R14g, R14h | 100K |
| R13c, R13d, R13e, R13f | 680K |
| R21, R22 | 1020 |
| R28, R29, R30, R31 | 1 |
| R25 | 82 |
| R26 | 22K |
| R15 | 1.25K |
| R16, R34, R35 | 2.5K |
| R17, R33 | 5K |
| R19 | 10K |
| R32, R51, R52 | 47K |
| R59 | 4.7K |
| R58 | 220 |
| R36-R47 | 100 |
| R48, R49 | 270 |
| R50 | 3.3K |
| R53 | 330K |

| Capacitors | Capacitance |
|---|---|
| C1, C2 | 100 uf |
| C3, C8 | 50 uf |
| C4, C5, C7, C21, C30 | .1 uf |
| C6 | 100 pf |
| C10, C13 | 47 pf |
| C9, C11, C12, C14 | .02 uf |
| C15, C16, C18, C20 | .01 uf |
| C17, C19 | 1 uf |
| C22, C23 | 22 pf |

| Potentiometers | Ohms |
|---|---|
| P1, P2 | 500 |
| P3 | 10K |

The various Ic's (integrated circuit chips) have already been fully identified. The following software contains the program for microcomputer IC12 for performing the functions which have already been fully described.

| ADDRESS | DATA OR INSTRUCTION | | LABEL | MNEMONIC | COMMENT |
|---|---|---|---|---|---|
| 0 | 2 | 4 | ENTRY: | JMP RSTI | |
| 1 | 0 | 0 | | — | |
| 2 | 0 | 0 | | NOP | |
| 3 | C | 5 | INT: | SEL RB0 | |
| 4 | 0 | 4 | | JMP SYNC | |

-continued

| ADDRESS | DATA OR INSTRUCTION | LABEL | MNEMONIC | COMMENT |
|---|---|---|---|---|
| 5 | D 0 | | — | |
| 6 | 0 0 | | NOP | |
| 7 | C 5 | TIMER: | SEL RB0 | TIMER INTERRUPT ROUTINE |
| 8 | 1 5 | | DIS I | |
| 9 | 6 5 | | STOP TCNT | |
| A | 2 3 | | MOV A , #FE | |
| B | F E | | — | |
| C | 3 9 | | OUTL P1, A | |
| D | 5 6 | | JTI , TM1 | TEST FOR LOCKOUT |
| E | 1 2 | | — | |
| F | 2 7 | | CLR A | |
| 0 1 0 | 3 7 | | CPL A | SIGNAL LOCKOUT AND RETURN |
| 1 | 9 3 | | RETR | |
| 2 | F E | TM1: | MOV A, R6 | |
| 3 | 3 9 | | OUTL P1, A | |
| 4 | B 8 | | MOV R0, #30 | |
| 5 | 3 0 | | — | |
| 6 | A 0 | | MOV @R0,A | STORE THIS PULSE PATTERN |
| 7 | E B | | DJNZ R3, * | TIME OUT $T_l$ |
| 8 | 1 7 | | — | |
| 9 | F A | | MOV A,R2 | |
| 1 A | B 2 | | MOV T,A | LOAD TIME WITH $T_m$ |
| 1 B | 5 5 | | STRT T | BEGIN TIMING |
| 1 C | E 9 | | DJNZ R1, * + 2 | DECREMENT $N_p$ |
| 1 D | 2 0 | | — | |
| 1 E | B 9 | | MOV R1, #06 | IF $N_p = 0$ SET $N_p = 6$ |
| 1 F | 0 6 | | — | |
| 2 0 | 2 3 | | MOV A, #OF | FLAG COMPLETION |
| 2 1 | 0 F | | — | |
| 2 2 | 9 3 | | RETR | |
| 0 3 0 | C 8 | DADD | DEC R0 | DOUBLE ADD |
| 1 | 7 0 | | ADDC A @R0 | PAIR AT @ R0 ADD TO R2,ACC |
| 2 | 1 8 | | INC R0 | |
| 3 | 2 A | | XCH A,R2 | |
| 4 | 7 0 | | ADDC A@R0 | |
| 5 | 2 A | | XCH A,R2 | |
| 6 | 8 3 | | RET | |
| 7 | C 8 | DMIN | DEC R0 | DOUBLE SUBTRACT |
| 8 | 3 7 | | CPL A | PAIR AT @R0 SUB FROM R2,ACC |
| 9 | 6 0 | | ADD A,@R0 | |
| 3 A | 3 7 | | CPL A | |
| 3 B | 1 8 | | INC R0 | |
| 3 C | 2 A | | XCH A,R2 | |
| 3 D | 3 7 | | CPL A | |
| 3 E | 7 0 | | ADDC A @R0 | |
| 3 F | 3 7 | | CPL A | |
| 4 0 | 2 A | | XCH A,R2 | |
| 4 1 | 8 3 | | RET | |
| 2 | C 8 | DLD: | DEC R0 | DOUBLE LOAD |
| 3 | F 0 | | MOV A,@R0 | LOAD PAIR AT@R0 INTO R2,A |
| 4 | 1 8 | | INC R0 | |
| 5 | 2 A | | XCH A,R2 | |
| 6 | F 0 | | MOV A,@R0 | |
| 7 | 2 A | | XCH A,R2 | |
| 8 | 8 3 | | RET | |
| 9 | C 8 | DST: | DEC R0 | DOUBLE STORE |
| 4 A | A 0 | | MOV @R0, A | STORE R2,A INTO PAIR AT @R0 |
| 4 B | 1 8 | | INC R0 | |
| 4 C | 2 A | | XCH A, R2 | |
| 4 D | A 0 | | MOV@R0, A | |
| 4 E | 2 A | | XCH A, R2 | |
| 4 F | 8 3 | | RET | |
| 0 5 0 | C 8 | DEX: | DEC R0 | DOUBLE EXCHANGE |
| 1 | 2 0 | | XCH A, @R0 | EXCHANGE PAIR AT@R0 WITH R2,A |
| 2 | 1 8 | | INC R0 | |
| 3 | 2 A | | XCH A,R2 | |
| 4 | 2 0 | | XCH A@R0 | |
| 5 | 2 A | | XCH A,R2 | |
| 6 | 8 3 | | RET | |
| 7 | F 7 | LLSH: | RLC A | DOUBLE LEFT LOGICAL SHIFT |
| 8 | 2 A | | XCH A,R2 | |
| 9 | F 7 | | RLC A | |
| 5 A | 2 A | | XCH A,R2 | |
| 5 B | 8 3 | | RET | |
| 5 C | 2 A | RLSH: | XCH A, R2 | DOUBLE RIGHT LOGICAL SHIFT |
| 5 D | 6 7 | | RRC A, | |
| 5 E | 2 A | | XCH A, R2 | |
| 5 F | 6 7 | | RRC A | |
| 6 0 | 8 3 | | RET | |
| 6 1 | B B | DM43: | MOV R3, #06 | DOUBLE MULT BY 4/3 |

-continued

| ADDRESS | | DATA OR INSTRUCTION | | LABEL | MNEMONIC | COMMENT |
|---|---|---|---|---|---|---|
| 6 | 2 | 0 | 6 | | — | ENTRY WITH HI BYTE IN R2 |
| | 3 | B | 8 | | MOV R0, #29 | USES RTMP1 & RTMP2 |
| | 4 | 2 | 9 | | — (RTMP 1) | DOUBLE REGISTER PAIRS, |
| | 5 | 1 | 4 | | CALL DST | R0 FOR POINTER |
| | 6 | 4 | 9 | | — | RESULT IN R2,A, RTMP 2 |
| | 7 | B | 8 | | MOV R0, #2B | MUST USE RB1 |
| | 8 | 2 | B | | — (RTMP 2) | HI BYTE MUST BE <> |
| | 9 | 1 | 4 | | CALL DST | |
| 6 | A | 4 | 9 | | — | |
| | B | B | 8 | DMLP: | MOV R0, #29 | (RTMP1) |
| | C | 2 | 9 | | — | |
| | D | 1 | 4 | | CALL DLD | |
| | E | 4 | 2 | | — | |
| | F | 9 | 7 | | CLR C | |
| 0 7 | 0 | 1 | 4 | | CALL RLSH | |
| | 1 | 5 | C | | — | |
| | 2 | 9 | 7 | | CLR C | |
| | 3 | 1 | 4 | | CALL RLSH | |
| | 4 | 5 | C | | — | |
| | 5 | 1 | 4 | | CALL DST | |
| | 6 | 4 | 9 | | — | |
| | 7 | B | 8 | | MOV R0,#2B | (RTMP2) |
| | 8 | 2 | B | | — | |
| | 9 | 1 | 4 | | CALL DADD | |
| 7 | A | 3 | 0 | | — | |
| | B | 1 | 4 | | CALL DST | |
| | C | 4 | 9 | | — | |
| | D | E | B | | DJNZ R3, DMLP | |
| | E | 6 | B | | — | |
| | F | 8 | 3 | | RET | |
| 0 8 | 0 | 9 | 7 | WAIT4: | CLR C | SUBROUTINE WAIT4 |
| | 1 | B | 9 | | MOV R1, #0C | WAITS FOR NEXT TRANSITION |
| | 2 | 0 | C | | — | OF INTERRUPT PIN |
| | 3 | B | 8 | C2: | MOV R0,#28 | ENTER WITH ACC = 0 for ↓ |
| | 4 | 2 | 8 | | — | ACC = + for ↑ |
| | 5 | 8 | 6 | NEXTT: | JNI NEG | IF NO TRANSITION IN TIME, |
| | 6 | 8 | B | | — | EXIT WITH CARRY SET |
| | 7 | C | 6 | | JZ RETEST | |
| | 8 | 8 | D | | — | |
| | 9 | 0 | 4 | | JMP EXIT | |
| | A | 9 | 7 | | — | |
| | B | C | 6 | NEG: | JZ EXIT | |
| | C | 9 | 7 | | — | |
| | D | 1 | 6 | RETEST: | JTF * +2 | |
| | E | 9 | 1 | | — | |
| | F | 0 | 4 | | JMP * +2 | |
| 0 9 | 0 | 9 | 2 | | — | |
| | 1 | 1 | F | | INC R7 | |
| | 2 | E | 8 | | DJNZ R0, NEXTT | |
| | 3 | 8 | 5 | | — | |
| | 4 | E | 9 | | DJNZ R1, C2 | |
| | 5 | 8 | 3 | | — | |
| | 6 | A | 7 | | CPL C | |
| | 7 | 8 | 9 | EXIT: | ORL P1,#FF | |
| | 8 | F | F | | — | |
| | 9 | 8 | 3 | | RET | |
| | A | B | 8 | DLY: | MOV R0,#14 | SUBROUTINE DLY |
| | B | 1 | 4 | | — | DELAY BEFORE CALLING |
| | C | E | 8 | | DJNZ R0, * | WAIT 4 |
| | D | 9 | C | | — | |
| | E | 0 | 4 | | JMP WAIT4 | |
| | F | 8 | 0 | | — | |
| 0 A | 0 | 9 | 7 | ROTST: | CLR C | SUBROUTINE ROTST |
| | 1 | C | 6 | | JZ RNEG | TESTS PHASE ROTATION |
| | 2 | A | 5 | | — | AND CONSISTANCY OF SYNC |
| | 3 | 2 | 3 | | MOV A,#02 | SIGNALS. |
| | 4 | 0 | 2 | | — | ENTER WITH ACC = 0 FOR 4A NEG, |
| | 5 | 4 | 6 | RNEG: | JNTI, BNEG | ELSE 4A POS. |
| | 6 | A | 9 | | — | CY SET IF ERROR. |
| | 7 | 0 | 3 | BNEG: | ADD A, #02 | |
| | 8 | 0 | 2 | | — | |
| | 9 | 0 | 3 | BNEG: | ADD A,#02 | |
| | A | 0 | 2 | | — | |
| | B | B | 8 | | MOV R0,#2C | |
| | C | 2 | C | | (ROT) | |
| | D | 2 | 0 | | XCHA,@R0 | |
| | E | 6 | 0 | | ADD A,@R0 | |
| | F | 0 | 3 | | ADD A,#F8 | |
| B | 0 | F | 8 | | — | |
| | 1 | 9 | 7 | | CLR C | |

-continued

| ADDRESS | | | DATA OR INSTRUCTION | | LABEL | MNEMONIC | COMMENT |
|---|---|---|---|---|---|---|---|
| | | 2 | C | 6 | | JZ RXIT | |
| | | 3 | B | 5 | | — | |
| | | 4 | A | 7 | | CPL C | |
| | | 5 | 8 | 3 | | RET | |
| | B | B | 7 | 0 | | — | |
| | | C | 1 | 4 | | CALL DISP | |
| | | D | C | 0 | | — | |
| | | E | 2 | 4 | | JMP TRIP | |
| | | F | 1 | F | | — | |
| | C | 0 | B | 8 | DISP: | MOV R0,#2D | SUBROUTINE DISP. |
| | | 1 | 2 | D | | (RMSK) | ENTER REPETITIVELY WITH |
| | | 2 | 3 | 7 | | CPL A | CHARACTER PATTERN IN ACC. |
| | | 3 | 5 | 0 | | ANL A,@R0 | CURRENT MASK IN RMSK |
| | | 4 | 3 | 7 | | CPL A | |
| | | 5 | 0 | 2 | | OUTL BUS,A | |
| | | 6 | F | 0 | | MOV A,@R0 | |
| | | 7 | 9 | 7 | | CLR C | |
| | | 8 | 6 | 7 | | RRC A | |
| | | 9 | 9 | 6 | | JNZ BY | |
| | | A | C | D | | — | |
| | | B | 2 | 3 | | MOV A,#80H | |
| | | C | 8 | 0 | | — | |
| | | D | A | 0 | BY: | MOV@R0,A | |
| | | E | 8 | 3 | | RET | |
| | | F | 0 | 0 | | NOP | |
| | D | 0 | A | F | SYNC | MOV R7,A | SYNC INTERRUPT ROUTINE |
| | | 1 | 4 | 2 | | MOV A,T | SAVES CURRENT VALUES OF |
| | | 2 | A | D | | MOV R5,A | NP AND TIMER AT |
| | | 3 | F | 9 | | MOV A,R1 | SYNC INTERRUPT TIME |
| | | 4 | A | C | | MOV R4,A | |
| | | 5 | A | 5 | | CLR F1 | |
| | | 6 | F | F | | MOV A,R7 | |
| | | 7 | 1 | 5 | | DIS I | |
| | | 8 | 9 | 3 | | RETR | |
| | E | 0 | 9 | 7 | FREQ: | CLR C | SUBROUTINE FREQ. |
| | | 1 | F | D | | MOV A,R5 | TEST FREQUENCY LIMITS |
| | | 2 | 9 | 6 | | JNZ FX | LIMITS 45HZ–66HZ |
| | | 3 | F | 2 | | — | |
| | | 4 | 4 | 2 | | MOV A, T | |
| | | 5 | A | D | | MOV R5,A | |
| | | 6 | F | F | | MOV A,R7 | |
| | | 7 | C | 6 | | JZ F2 | |
| | | 8 | E | E | | — | |
| | | 9 | F | D | | MOV A,R5 | |
| | | A | 0 | 3 | | ADD A,#ED | |
| | | B | E | D | | — | |
| | | C | 0 | 4 | | JMP FX | |
| | | D | F | 2 | | — | |
| | | E | F | D | F2: | MOV A,R5 | |
| | | F | 0 | 3 | | ADD A,#BB | |
| | F | 0 | B | B | | — | |
| | | 1 | A | 7 | | CPL C | |
| | | 2 | 2 | 7 | FX: | CLR A | |
| | | 3 | 8 | 3 | | RET | |
| 1 | 0 | 0 | 1 | 5 | RST1: | DIS I | RESET & INITIALIZE SECTION |
| | | 1 | 3 | 5 | | DIS TCNTI | |
| | | 2 | D | 5 | | SEL RB1 | |
| | | 3 | B | 8 | | MOV R0,#20 | |
| | | 4 | 2 | 0 | | | |
| | | 5 | F | 0 | | MOV A,@R0 | FIRST TIME TEST REGISTER |
| | | 6 | 0 | 3 | | ADD A,#AA | |
| | | 7 | A | A | | — | |
| | | 8 | C | 6 | | JZ TRIP | |
| | | 9 | 1 | F | | — | |
| | | A | 3 | 7 | | CPL A | |
| | | B | C | 6 | | JZ PLTST | |
| | | C | 1 | 5 | | — | |
| | | D | B | 8 | | MOV R0,#55 | POWER UP ENTRY |
| | | E | 5 | 5 | | — | |
| | | F | 2 | 7 | | CLR A | |
| 1 | 1 | 0 | A | A | | MOV R2,A | |
| | | 1 | B | 8 | | MOV R0,#,25 | PL REG |
| | | 2 | 2 | 5 | | — | |
| | | 3 | 1 | 4 | | CALL DST | INITIALIZE PLREG |
| | | 4 | 4 | 9 | | — | |
| | | 5 | B | 8 | PLTST | MOV R0,#25 | |
| | | 6 | 2 | 5 | | (PLREG) | |
| | | 7 | B | A | | MOV R2,#0F | |
| | | 8 | 0 | F | | — | |
| | | 9 | 1 | 4 | | CALL DADD | INCREMENT PLREG |

-continued

| ADDRESS | | | DATA OR INSTRUCTION | | LABEL | MNEMONIC | COMMENT |
|---|---|---|---|---|---|---|---|
| | | A | 3 | 0 | | — | |
| | | B | 1 | 4 | | CALL DST | |
| | | C | 4 | 9 | | — | |
| | | D | E | 6 | | JNC LOKTST | |
| | | E | 3 | 0 | | — | |
| | | F | B | 8 | TRIP | MOV R0,#20 | |
| 1 | 2 | 0 | 2 | 0 | | — | |
| | | 1 | B | 0 | | MOV@R0,#56 | FLAG TRIP |
| | | 2 | 5 | 6 | | — | |
| | | 3 | 2 | 3 | | MOV A,#7F | |
| | | 4 | 7 | F | | — | |
| | | 5 | 3 | 9 | | OUTL P1,A | |
| | | 6 | 0 | 4 | | JMP DSPTRP | |
| | | 7 | B | A | | — | |
| | | 8 | 2 | 3 | LOKI: | MOV A,#FE | |
| | | 9 | F | E | | — | |
| | | A | 3 | 5 | | DIS TCNTI | |
| | | B | 2 | 4 | | JMP LOK2 | |
| | | C | 3 | 2 | | — | |
| | | D | 0 | 0 | | NOP | |
| | | E | 0 | 0 | | NOP | |
| | | F | 0 | 0 | | NOP | |
| 1 | 2 | 1 | b | 0 | | MOV@R0,#56 | FLAG TRIP |
| | | 2 | 5 | 6 | | — | |
| | | 3 | 2 | 3 | | MOV A,#7F | |
| | | 4 | 7 | F | | — | |
| | | 5 | 3 | 9 | | OUTL P1,A | |
| | | 6 | 0 | 4 | | JMP DSPTRP | |
| | | 7 | B | A | | — | |
| | | 8 | 2 | 3 | LOKI: | MOV A,#F# | |
| | | 9 | F | E | | — | |
| | | A | 3 | 5 | | DIS TCNTI | |
| | | B | 2 | 4 | | JMP LOK2 | |
| | | C | 3 | 2 | | — | |
| | | D | 0 | 0 | | NOP | |
| | | E | 0 | 0 | | NOP | |
| | | F | 0 | 0 | | NOP | |
| 1 | 3 | 0 | 2 | 4 | LOKTST: | JMP LOK1 | ENTRY FOR LOCKOUT TEST |
| | | 1 | 2 | 8 | | — | |
| | | 2 | 3 | 9 | LOK2: | OUTL p1,A | |
| | | 3 | 5 | 6 | | JTI PERTST | |
| | | 4 | 3 | B | | — | |
| | | 5 | 2 | 3 | | MOV A,#67 | "L" |
| | | 6 | 6 | 7 | | — | |
| | | 7 | 1 | 4 | | CALL DISP | |
| | | 8 | C | 0 | | — | |
| | | 9 | 2 | 4 | | JMP LOKTST | |
| | | A | 3 | 0 | | — | |
| | | B | 2 | 7 | PERTST | CLR A | |
| | | C | 1 | 4 | | CALL WAIT4 | |
| | | D | 8 | 0 | | — | |
| | | E | E | 6 | | JNC PERI | |
| | | F | 4 | 6 | | — | |
| 1 | 4 | 0 | 2 | 3 | DISPA: | MOV A,#50 | "A" |
| | | 1 | 5 | 0 | | — | |
| | | 2 | 1 | 4 | | CALL DISP | |
| | | 3 | C | 0 | | — | |
| | | 4 | 2 | 4 | | JMP LOKTST | |
| | | 5 | 3 | 0 | | — | |
| | | 6 | 3 | 7 | PERI: | CPLA | |
| | | 7 | 1 | 4 | | CALL DLY | ↑ |
| | | 8 | 9 | A | | — | |
| | | 9 | F | 6 | | JC DISPA | |
| | | A | 4 | 0 | | — | |
| | | B | 1 | 4 | | CALL ROT | ↑ FIRST CALL - SETS ROTATION |
| | | C | A | 0 | | — | |
| | | D | 2 | 4 | | JMP PER2 | NO ERROR TEST |
| | | E | 5 | 6 | | — | |
| | | F | 2 | 3 | DISPB: | MOV A,#46 | "b" |
| 1 | 5 | 0 | 4 | 6 | | — | |
| | | 1 | 1 | 4 | | CALL DISP | |
| | | 2 | C | 0 | | — | |
| | | 3 | 2 | 4 | | JMP LOKTST | |
| | | 4 | 3 | 0 | | — | |
| | | 5 | 0 | 0 | | NOP | |
| | | 6 | D | 5 | PER2 | SEL RBI | |
| | | 7 | 2 | 7 | | CLR A | |
| | | 8 | A | D | | MOV R5,A | |
| | | 9 | 6 | 2 | | MOV T,A | |
| | | A | A | F | | MOV R7,A | |

-continued

| ADDRESS | DATA OR INSTRUCTION | LABEL | MNEMONIC | COMMENT |
|---|---|---|---|---|
| B | B E | | MOV R6,#08 | |
| C | 0 8 | | — | |
| D | 1 4 | | CALL DLY | ↓ |
| E | 9 A | | — | |
| F | F 6 | | JC DISP A | |
| 1 6 0 | 4 0 | | — | |
| 1 6 1 | 5 5 | | START T | |
| 2 | 1 4 | PRLOOP: | CALL ROT | ↓ |
| 3 | A 0 | | — | |
| 4 | F 6 | | JC DISP B | |
| 5 | 4 F | | — | |
| 6 | 3 7 | | CPL A | |
| 7 | 1 4 | | CALL DLY | ↑ |
| 8 | 9 A | | — | |
| 9 | F 6 | | JC DISPA | |
| A | 4 0 | | — | |
| B | 1 4 | | CALL ROT | ↑ |
| C | A 0 | | — | |
| D | F 6 | | JC DISPB | |
| E | 4 F | | — | |
| F | 2 7 | | CLR A | |
| 1 7 0 | 1 4 | | CALL DLY | ↓ |
| 1 | 9 A | | — | |
| 2 | F 6 | | JC DISPA | |
| 3 | 4 0 | | — | |
| 4 | 1 4 | | CALL FREQ | |
| 5 | E 0 | | — | |
| 6 | E 6 | | JNC PER3 | |
| 7 | 7 E | | — | |
| 8 | 2 3 | | MOVA,#72 | "F" |
| 9 | 7 2 | | — | |
| A | 1 4 | | CALL DISP | |
| B | C 0 | | — | |
| C | 2 4 | | JMP PER2 | |
| D | 5 7 | | — | |
| E | E E | PER#: | DJNZ R6,PRLOOP | |
| F | 6 2 | | — | |
| 1 8 0 | 6 5 | | STOP TCNT | |
| 1 | 2 7 | | CLR A | |
| 2 | 1 4 | | CALL ROT | ↓ |
| 3 | A 0 | | — | |
| 4 | F 6 | | JC DISPB | |
| 5 | 4 F | | — | |
| 6 | 1 6 | | JTF *+2 | |
| 7 | 8 A | | — | |
| 8 | 2 4 | | JMP *+2 | |
| 9 | 8 B | | — | |
| A | 1 F | | INCR7 | |
| B | F F | | MOV A,R7 | |
| C | A A | | MOV R2,A | |
| D | 4 2 | | MOV A,T | |
| E | 1 4 | | CALL DM43 | |
| F | 6 1 | | — | |
| 1 9 0 | 9 7 | | CLR C | |
| 1 | 1 4 | | CALL LLSH | |
| 2 | 5 7 | | — | |
| 3 | 9 7 | | CLR C | |
| 4 | 1 4 | | CALL LLSH | |
| 5 | 5 7 | | — | |
| 6 | 9 7 | | CLR C | |
| 7 | B 8 | | MOV R0,#F | |
| 8 | 1 F | | — | |
| 9 | B E | | MOV R6,#60 | |
| A | 6 0 | | — | |
| B | B F | | MOV R7,#01 | |
| C | 0 1 | | — | |
| D | 1 4 | | CALL DMIN | |
| E | 3 7 | | — | |
| F | B 8 | | MOV R0,#23 | |
| 1 A 0 | 2 3 | | | |
| 1 A 1 | 1 4 | | CALL DST | |
| 2 | 4 9 | | — | |
| 3 | 2 7 | | CLR A | |
| 4 | 3 7 | | CPL A | |
| 5 | 1 4 | | CALL WAIT4 | ↑ |
| 6 | A 0 | | — | |
| 7 | F 6 | | JC DISPA | |
| 8 | 4 0 | | — | |
| 9 | 1 4 | | CALL ROT | ↑ |
| A | A 0 | | — | |

-continued

| ADDRESS | | | DATA OR INSTRUCTION | | LABEL | MNEMONIC | COMMENT |
|---|---|---|---|---|---|---|---|
| | | B | B | C | INIT: | MOV R4,#0F | K - 0F |
| | | C | 0 | F | | — | |
| | | D | C | 5 | | SEL RB0 | |
| | | E | B | 9 | | MOV R1,#04 | NP=4 |
| | | F | 0 | 4 | | — | |
| 1 | B | 0 | B | C | | MOV R4,#04 | SNP=4 |
| | | 1 | 0 | 4 | | — | |
| | | 2 | B | D | | MOV R5,#FF | $\overline{STM}$ = FF |
| | | 3 | F | F | | — | |
| | | 4 | B | E | | MOV R6,#FF | RPS = FF |
| | | 5 | F | F | | — | |
| | | 6 | B | 8 | | MOV R0,#23 | (ATM) |
| | | 7 | 2 | 3 | | — | |
| | | 8 | F | 0 | | MOV A,@R0 | |
| | | 9 | 3 | 7 | | CPL A | |
| | | A | A | A | | MOV R2,A | $\overline{Tm}$ - CPL (ATM) |
| | | B | C | 8 | | DEC R0 | |
| | | C | F | 0 | | MOV A,@R0 | |
| | | D | 4 | 7 | | SWAP A | |
| | | E | 5 | 3 | | ANL A,#0F | |
| | | F | 0 | F | | — | |
| 1 | C | 0 | 1 | 7 | | INC A | |
| | | 1 | A | B | | MOV R3,A | $T_L$ = INT (ATL/16)+1 |
| | | 2 | 8 | 9 | | ORL PI,#FF | |
| | | 3 | F | F | | — | |
| | | 4 | B | 8 | | MOV R0,#23 | |
| | | 5 | 2 | 3 | | — | (ATM) |
| | | 6 | F | 0 | | MOV A,@R0 | |
| | | 7 | 9 | 7 | | CLR C | |
| | | 8 | 6 | 7 | | RRC A | |
| | | 9 | 9 | 7 | | CLR C | |
| | | A | 6 | 7 | | RRC A | |
| | | B | 6 | 0 | | ADD A,@R0 | |
| | | C | 0 | 3 | | ADD A,#02 | |
| | | D | 0 | 2 | | — | |
| | | E | 9 | 7 | | CLR C | |
| | | F | 6 | 7 | | RRC A | |
| 1 | D | 0 | 9 | 7 | | CLR C | |
| | | 1 | 6 | 7 | | RRC A | |
| | | 2 | B | 8 | | MOV R0,#27 | |
| | | 3 | 2 | 7 | | — | |
| | | 4 | A | 0 | | MOV@R0,A | ATM/3 |
| | | 5 | D | 5 | | SEL RBI | |
| | | 6 | B | B | | MOV R5,#07 | |
| | | 7 | 0 | 7 | | — | |
| | | 8 | B | 8 | | MOV R0,#31 | |
| | | 9 | 3 | 1 | | — | |
| | | A | B | 0 | | MOV@R0,#40 | |
| | | B | 4 | 0 | | — | |
| | | C | C | 8 | | DEC R0 | |
| | | D | B | 0 | | MOV@R0,#D0 | |
| | | E | D | 0 | | — | |
| | | F | A | 5 | | CLR FI | |
| 1 | E | 0 | 2 | 7 | | CLR A | |
| | | 1 | 1 | 4 | | CALL WAIT4 | ↓ WAIT4 TO START |
| | | 2 | 8 | 0 | | — | |
| | | 3 | F | 6 | | JC DISPA | |
| | | 4 | 4 | 0 | | — | |
| | | 5 | 2 | 5 | | EN TCNTI | |
| | | 6 | 1 | 4 | | CALL TIMER | |
| | | 7 | 0 | 7 | | — | |
| | | 8 | 4 | 4 | | JMP PHASE | |
| | | 9 | 0 | 4 | | | |
| 2 | 0 | 0 | 4 | 2 | PHASE 1: | MOV A,T | WAIT FOR |
| | | 1 | 1 | 7 | | INC A | COUNT BEFORE TIMER |
| | | 2 | 9 | 6 | | JNZ * −2 | INTERRUPT |
| | | 3 | 0 | 0 | | NOP | |
| | | 4 | 1 | 5 | PHASE: | DIS I | WAIT FOR TIMER INTERRUPT |
| | | 5 | C | 6 | | JZ--PHASE | |
| | | 6 | 0 | 5 | | — | |
| | | 7 | 3 | 7 | | CPL A | |
| | | 8 | C | 6 | | JZ PLOK | |
| | | 9 | 6 | 8 | | — | |
| | | A | 7 | 6 | PHI: | JFI *+3 | |
| | | B | 0 | E | | — | |
| | | C | 8 | 5 | | CLRF0 | |
| | | D | 9 | 5 | | CPLF0 | |
| | | E | B | 6 | | JF0 PH2 | |
| | | F | 1 | 3 | | — | |

-continued

| ADDRESS | | | DATA OR INSTRUCTION | | LABEL | MNEMONIC | COMMENT |
|---|---|---|---|---|---|---|---|
| 2 | 1 | 0 | 0 | 5 | | ENI | |
|   |   | 1 | 4 | 4 | | JMP PH3 | |
|   |   | 2 | 1 | C | | — | |
|   |   | 3 | 8 | 6 | PH2: | JNI PH3 | |
|   |   | 4 | 1 | C | | | |
|   |   | 5 | 8 | 5 | | CLR F0 | SET FOR FLAG |
|   |   | 6 | 1 | 4 | | CALL ROT | ↑ |
|   |   | 7 | A | 0 | | — | |
|   |   | 8 | E | 6 | | JNC *+2 | |
|   |   | 9 | 1 | C | | — | |
|   |   | A | 2 | 4 | EDSB: | JMP DIS B | |
|   |   | B | 4 | F | | — | |
|   |   | C | D | 5 | PH3: | SEL RBI | |
|   |   | D | 4 | 4 | | JMP GETE | |
|   |   | E | 2 | 0 | | — | |
|   |   | F | 0 | 0 | | NOP | |
| 2 | 2 | 0 | B | F | GET E: | MOV R7,#08 | A-D CONVERSION ROUTINE |
|   |   | 1 | 0 | 8 | | — | |
|   |   | 2 | 2 | 7 | | CLR A | |
|   |   | 3 | A | D | | MOV R5,A | |
|   |   | 4 | A | E | | MOV R6,A | |
|   |   | 5 | 9 | 7 | | CLR C | |
|   |   | 6 | A | 7 | | CPL C | |
|   |   | 7 | F | D | LOOP: | MOV A,R5 | |
|   |   | 8 | 6 | 7 | | RRC A | |
|   |   | 9 | A | D | | MOV R5,A | |
|   |   | A | 4 | E | | ORL A,R6 | |
|   |   | B | 3 | A | | OUTL P2,A | |
|   |   | C | 2 | 6 | | JNTO NOPE | |
|   |   | D | 2 | F | | — | |
|   |   | E | A | E | | MOV R6,A | |
|   |   | F | E | F | NOPE: | DJNZ R7,LOOP | |
| 2 | 3 | 0 | 2 | 7 | | — | |
|   |   | 1 | 3 | 7 | | CPL A | |
|   |   | 2 | B | 8 | | MOV R0,#2E | (ERR) |
|   |   | 3 | 2 | E | | — | |
|   |   | 4 | A | 0 | | MOV@R0,A | STORE ERR |
|   |   | 5 | 2 | 7 | | CLR A | |
|   |   | 6 | 1 | 8 | | INC R0 | |
|   |   | 7 | A | 0 | | MOV@R0,A | ZERO MSB ERR |
|   |   | 8 | E | B | | DJNZ R3,E1 | TEST FOR NO INT |
|   |   | 9 | 3 | E | | — | |
|   |   | A | 2 | 4 | ER5: | JMP DISPA | |
|   |   | B | 4 | 0 | | — | |
|   |   | C | 0 | 0 | | NOP | |
|   |   | D | 0 | 0 | | NOP | |
|   |   | E | B | 8 | E1: | MOV R0,#2F | (ERR) |
|   |   | F | 2 | F | | — | |
| 2 | 4 | 0 | F | C | | MOV A,R4 | GET K |
|   |   | 1 | 0 | 3 | | ADD A,#10 | |
|   |   | 2 | 1 | 0 | | — | |
|   |   | 3 | E | 3 | | MOVP3A,@A | GET KTBL ENTRY |
|   |   | 4 | B | A | | MOVR2,#40 | PRESET OFFSET = 4088 H |
|   |   | 5 | 4 | 0 | | — | |
|   |   | 6 | 1 | 4 | | CALL DADD | ADD RND TO ERR |
|   |   | 7 | 3 | 0 | | — | |
|   |   | 8 | 1 | 4 | | CALL DST | |
|   |   | 9 | 4 | 9 | | — | |
|   |   | A | E | C | | DJNZ R4,E2 | DECR, K |
|   |   | B | 4 | E | | — | |
|   |   | C | B | C | | MOV R4,#10 | |
|   |   | D | 1 | 0 | | — | |
|   |   | E | C | 5 | E2 | SEL RB0 | |
|   |   | F | F | C | | MOV A,B4 | GET SNP |
| 2 | 5 | 0 | 0 | 3 | | ADD A,#FB | |
|   |   | 1 | F | B | | — | |
|   |   | 2 | C | 6 | | JZ ER5 | IF SNP=5 GO TO ER5 |
|   |   | 3 | 3 | A | | — | |
|   |   | 4 | 1 | 7 | | INC A | |
|   |   | 5 | 9 | 6 | | JNZ E3 | IF SNP <>4 GET PULSE PATTERN |
|   |   | 6 | 5 | B | | — | |
|   |   | 7 | B | E | | MOV R5,#FF | IF SNP=4 NO PULSE OUTPUT |
|   |   | 8 | F | F | | — | |
|   |   | 9 | 4 | 4 | | JMP E4 | |
|   |   | A | 7 | 0 | | — | |
|   |   | B | B | 8 | | MOV R0,#2C | (ROT) |
|   |   | C | 2 | C | | — | |
|   |   | D | F | 0 | | MOV A,@R0 | |
|   |   | E | 5 | 3 | | ANL A,@02 | EXTRACT ROTATION BIT |
|   |   | F | 0 | 2 | | — | |

-continued

| ADDRESS | | | DATA OR INSTRUCTION | | LABEL | MNEMONIC | COMMENT |
|---|---|---|---|---|---|---|---|
| 2 | 6 | 0 | E | 7 | | RLA | |
| | | 1 | F | 7 | | RLA | |
| | | 2 | 6 | 9 | | ADD A,R1 | NP+0 = FWD, NP+8 = REV |
| | | 3 | E | 3 | | MOVP3A,@A | GET PULSE PATTERN FROM TABLE |
| | | 4 | A | E | | MOVR6,A | |
| | | 5 | 4 | 4 | | JMP E4 | |
| | | 6 | 7 | 0 | | — | |
| | | 7 | 0 | 0 | | NOP | |
| | | 8 | D | 5 | PLOK: | SEL RBI | |
| | | 9 | 2 | 4 | | JMP LOKTST | |
| | | A | 3 | 0 | | — | |
| 2 | 7 | 0 | 7 | 6 | E4: | JFI ENORM | |
| | | 1 | B | 0 | | — | |
| | | 2 | 8 | 5 | | CLRFO | |
| | | 3 | 9 | 5 | | CPLFO | |
| | | 4 | A | 5 | | CLRFI | |
| | | 5 | B | 5 | | CPLFI | RESET FLAGS |
| | | 6 | 2 | 7 | | CLR A | |
| | | 7 | D | 5 | | SEL RBI | |
| | | 8 | 1 | 4 | | CALL ROT | ↓ |
| | | 9 | A | 0 | | | |
| | | A | E | 6 | | JNC *+2 | |
| | | B | 7 | E | | — | |
| | | C | 2 | 4 | | JMP DISB | |
| | | D | 4 | F | | — | |
| | | E | 4 | 4 | | JMP *+1 | |
| | | F | 8 | 0 | | — | |
| 2 | 8 | 0 | B | B | SNPTST | MOV R3,#08 | RESET NTA |
| | | 1 | 0 | 8 | | | |
| | | 2 | C | 5 | | SEL RB0 | |
| | | 3 | F | C | | MOV A,R4 | GET SNP |
| | | 4 | 0 | 3 | | ADD A,#FA | |
| | | 5 | F | A | | — | |
| | | 6 | C | 6 | | JZ N6 | TEST FOR SNP=6 |
| | | 7 | 9 | 0 | | — | |
| | | 8 | 1 | 7 | | INC A | |
| | | 9 | C | 6 | | JZ ER5 | TEST FOR SNP=5 |
| | | A | 3 | A | | — | |
| | | B | 1 | 7 | | INC A | |
| | | C | C | 6 | | JZ N4 | TEST FOR SNP=4 |
| | | D | 9 | 6 | | — | |
| | | E | 4 | 4 | | JMP ENORM | |
| | | F | B | 0 | | — | |
| 2 | 9 | 0 | F | D | N6 | MOV A,R5 | HIGH END STOP |
| | | 1 | B | 8 | | MOV R0,E23 | (ATM) |
| | | 2 | 2 | 3 | | | |
| | | 3 | 6 | 0 | | ADD A,@R0 | |
| | | 4 | 4 | 4 | | JMP NS | |
| | | 5 | 9 | 7 | | — | |
| | | 6 | F | D | N4 | MOV A,R5 | |
| | | 7 | D | 5 | N5 | SEL RBI | |
| | | 8 | A | A | | MOV R2,A | |
| | | 9 | 2 | 7 | | CLR A | |
| | | A | 9 | 7 | | CLR C | |
| | | B | B | 8 | | MOV R0,#2F | (ERR) |
| | | C | 2 | F | | — | |
| | | D | 1 | 4 | | CALL DADD | ADD END STOP CORRECTION |
| | | E | 3 | 0 | | — | TO ERROR |
| | | F | 1 | 4 | | CALL DST | |
| 2 | A | 0 | 4 | 9 | | — | |
| | | 1 | 4 | 4 | | JMP ENORM | |
| | | 2 | B | 0 | | — | |
| 2 | B | 0 | 4 | 4 | ENORM: | JMP *+1 | |
| | | 1 | B | 2 | | — | |
| | | 2 | D | 5 | | SEL RBI | |
| | | 3 | B | 8 | | MOV R0,#23 | (AT) |
| | | 4 | 2 | 3 | | — | |
| | | 5 | 9 | 7 | | CLR C | |
| | | 6 | 1 | 4 | | CALL DLD | GET AT |
| | | 7 | 4 | 2 | | — | |
| | | 8 | B | 8 | | MOV R0,#2F | (ERR) |
| | | 9 | 2 | F | | — | |
| | | A | 1 | 4 | | CALL DADD | AT + ERR |
| | | B | 3 | 0 | | — | |
| | | C | B | 8 | | MOV R0,#31 | (CONST) |
| | | D | 3 | 1 | | — | |
| | | E | 1 | 4 | | CALL DMIN | SUBTRACT CONST. |
| | | F | 3 | 7 | | — | |
| 2 | C | 0 | 4 | 7 | | SWAP A | |
| | | 1 | 5 | 3 | | ANL A,#0F | |

-continued

| ADDRESS | | DATA OR INSTRUCTION | | LABEL | MNEMONIC | COMMENT |
|---|---|---|---|---|---|---|
| | 2 | 0 | F | | — | |
| | 3 | C | 5 | | SEL RB0 | |
| | 4 | 1 | 7 | | INC A | |
| | 5 | A | B | | MOV R3,A | LOAD $T_L$ |
| | 6 | D | 5 | | SEL RB1 | |
| | 7 | F | A | | MOV A,R2 | |
| | 8 | 3 | 7 | | CPL A | |
| | 9 | C | 5 | | SEL RB0 | |
| | A | A | A | | MOV R2,A | LOAD $\overline{T}m$ |
| | B | 4 | 4 | | JMP R DISP | |
| | C | D | 0 | | — | |
| | D | 0 | 0 | | NOP | |
| | E | 0 | 0 | | NOP | |
| | F | 0 | 0 | | NOP | |
| 2 D | 0 | C | 5 | R DISP | SEL RB0 | |
| | 1 | F | C | | MOV A,B4 | GET SNP |
| | 2 | 9 | 7 | | CLR C | |
| | 3 | F | 7 | | RLC A | |
| | 4 | F | 7 | | RLC A | SNP * 4 |
| | 5 | B | 8 | | MOV R0,#28 | |
| | 6 | 2 | 8 | | | |
| | 7 | A | 0 | | MOV @R0,A | |
| | 8 | C | 8 | | DEC R0 | |
| | 9 | F | D | | MOV A,R5 | $\overline{STM}$ |
| | A | C | 6 | | JZ AX | IF ZERO, TOP END |
| | B | E | 7 | | — | |
| | C | 6 | 0 | | ADD A,@R0 | ADD ATM/3 |
| | D | F | 6 | | JC AX | |
| | E | E | 7 | | | |
| | F | 1 | 8 | | INC R0 | |
| 2 E | 0 | 1 | 0 | | INC@R0 | |
| | 1 | C | 8 | | DEC R0 | |
| | 2 | 6 | 0 | | ADD A,@R1 | ADD ATM/3 |
| | 3 | F | 6 | | JC AX | |
| | 4 | E | 7 | | — | |
| | 5 | 1 | 8 | | INC R0 | |
| | 6 | 1 | 0 | | INC@R0 | |
| | 7 | 2 | 3 | | MOV A,#40 | (DSP TBL) |
| | 8 | 4 | 0 | | | |
| | 9 | B | 8 | | MOV R0,#28 | |
| | A | 2 | 8 | | | |
| | B | 6 | 0 | | ADD A,@R0 | |
| | C | E | 3 | | MOVP3A,@A | GET CHARACTER |
| | D | 1 | 4 | | CALL DISP | |
| | E | C | 0 | | | |
| | F | 0 | 0 | | NOP | |
| 2 F | 0 | 7 | 4 | | CALL PLEDC | |
| | 1 | 3 | 0 | | — | |
| | 2 | C | 5 | | SEL RB0 | |
| | 3 | B | 8 | | MOV R0,#30 | |
| | 4 | 3 | 0 | | — | |
| | 5 | F | 0 | | MOV A,@R0 | |
| | 6 | 4 | E | | ORL A,R6 | OR LAST PULSE WITH NEW |
| | 7 | 3 | 9 | | OUTL P1,A | |
| | 8 | 2 | 7 | | CLR A | |
| | 9 | 4 | 4 | | JMP PHASE 1 | |
| | A | 0 | 0 | | — | |
| 3 0 | 0 | F | F | NP FWD | 7 6 5 4 3 2 1 0 | PULSE OUTPUT TABLE |
| | 1 | E | 7 | 1 | 1 1 1 0 0 1 1 1 | |
| | 2 | F | 3 | 2 | 1 1 1 1 0 0 1 1 | |
| | 3 | F | 9 | 3 | 1 1 1 1 1 0 0 1 | |
| | 4 | B | D | 4 | 1 0 1 1 1 1 0 1 | |
| | 5 | 9 | F | 4 | 1 0 0 1 1 1 1 1 | |
| | 6 | C | F | 6 | 1 1 0 0 1 1 1 1 | |
| | 7 | F | F | | | |
| | 8 | F | F | — | | |
| | 9 | C | F | 1 REV | 1 1 0 0 1 1 1 1 | |
| | A | 9 | F | 2 | 1 0 0 1 1 1 1 1 | |
| | B | B | D | 3 | 1 0 1 1 1 1 0 1 | |
| | C | F | 9 | 4 | 1 1 1 1 1 0 0 1 | |
| | D | F | 3 | 5 | 1 1 1 1 0 0 1 1 | |
| | E | E | 7 | 6 | 1 1 1 0 0 1 1 1 | |
| | F | F | F | — | | |
| 3 1 | 0 | 0 | 9 | KTBL | — | KTBL - PSEUDO RND 0-15 |
| | 1 | 0 | 9 | | | |
| | 2 | | 6 | | | |
| | 3 | | F | | | |
| | 4 | | 4 | | | |
| | 5 | | D | | | |

-continued

| ADDRESS | | DATA OR INSTRUCTION | | LABEL | MNEMONIC | COMMENT |
|---|---|---|---|---|---|---|
| | | 6 | A | | | |
| | | 7 | 3 | | | |
| | | 8 | 8 | | | |
| | | 9 | 1 | | | |
| | | A | E | | | |
| | | B | 7 | | | |
| | | C | C | | | |
| | | D | 5 | | | |
| | | E | 2 | | | |
| | | F | B | | | |
| 3 | 2 | 0 | 0 | | | |
| 3 | 3 | 0 | D 5 | PLDEC: | SEL RBI | SUBROUTINE PL DEC |
| | | 1 | B 8 | | MOV R0,#25 | DECREMENTS PL REGISTER |
| | | 2 | 2 5 | | — | DURING NORMAL OPERATION |
| | | 3 | B 8 | | MOV R2,#00 | |
| | | 4 | 0 0 | | — | |
| | | 5 | 2 3 | | MOV A,#01 | |
| | | 6 | 1 0 | | — | |
| | | 7 | 1 4 | | CALL DEX | |
| | | 8 | 5 0 | | — | |
| | | 9 | 1 4 | | CALL DMIN | |
| | | A | 3 7 | | — | |
| | | B | F 6 | | JC PLX | |
| | | C | 3 F | | — | |
| | | D | 1 4 | | CALL DEX | |
| | | E | 5 0 | | — | |
| | | F | 8 3 | PLX | RET | |
| 3 | 4 | 0 | 5 4 | DSPTBL | "H" | 0 1 0 1 0 1 0 0 |
| | | 1 | 5 4 | | "H" | |
| | | 2 | 5 4 | | "H" | |
| | | 3 | 6 2 | | "E" | 0 1 1 0 0 0 1 0 |
| | | 4 | D 9 | SNP=1 | "7" | 1 1 0 1 1 0 0 1 |
| | | 5 | 4 0 | | "8" | 0 1 0 0 0 0 0 0 |
| | | 6 | D 0 | | "9" | 1 1 0 1 0 0 0 0 |
| | | 7 | 6 2 | | "E" | |
| | | 8 | D 4 | SNP=2 | "4" | 1 1 0 1 0 1 0 0 |
| | | 9 | C 2 | | "5" | 1 1 0 0 0 0 1 0 |
| | | A | 4 2 | | "6" | 0 1 0 0 0 0 1 0 |
| | | B | 6 2 | | "E" | 1 1 0 1 1 1 0 1 |
| | | C | D D | SNP=3 | "1" | 0 1 1 0 1 0 0 0 |
| | | D | 6 8 | | "2" | |
| | | E | C 8 | | "3" | 1 1 0 0 1 0 0 0 |
| | | F | 6 2 | | "E" | |
| 3 | 5 | 0 | 4 1 | SNP=4 | "0" | 0 1 0 0 0 0 0 1 |
| | | 1 | 4 1 | | "0" | |
| | | 2 | 4 1 | | "0" | |
| | | 3 | 6 2 | | "E" | |
| | | 4 | 6 2 | SNP=5 | "E" | |
| | | 5 | 6 2 | | "E" | |
| | | 6 | 6 2 | | "E" | |
| | | 7 | 6 2 | | "E" | |
| | | 8 | 5 4 | SNP=6 | "H" | |
| | | 9 | 5 4 | | "H" | |
| | | A | 5 4 | | "H" | |
| | | B | 6 2 | | "E" | |

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a static converter for converting between a three phase a-c voltage and a d-c voltage by means of a rectifier circuit comprising at least one controlled rectifier associated with each phase and wherein the conduction of such one controlled rectifier is controlled by trigger pulses applied to a gate electrode with one of the a-c and d-c voltages being variable in magnitude by controlling the time of occurrence at which the trigger pulses are applied to the gate electrode, an improved controlled trigger circuit comprising: timing means for digitally timing the interval between phases relative to a determinable time occurrence of at least one phase of the three phase a-c and for determining therefrom a trigger sequence number representative of sixty electrical degrees and for providing the trigger pulses upon attainment of a digital count of said trigger sequence number which is representative of the time between successive trigger pulses whereby said time of occurrence for the trigger pulses will be controlled, regulation means responsive to variations in magnitude of at least one of the voltage and current of one of the a-c and d-c voltages and for digitally providing an error number varying in magnitude in response to such variations, control circuit means responsive to said error number for varying the magnitude of said trigger sequence number at said timing means whereby the time between successive trigger pulses will be varied and hence said time of occurrence will be varied to regulate the magnitude of said at least one of the voltage and current, and fixed frequency clock means for providing clock pulses at a fixed known frequency from which the timing functions are performed.

2. The circuit of claim 1 with said regulation means providing said error number before the occurrence of each trigger pulse and with said control circuit means responsive to said error number for accordingly varying the magnitude of said trigger sequence number before each trigger pulse.

3. The circuit of claim 1 with said regulation means providing a first signal varying in magnitude in accordance with variations in magnitude of said at least one of the voltage and current, said first signal having a predetermined magnitude representative of a desired magnitude of said at least one of the voltage and current with variations from said predetermined magnitude being representative of error to be corrected, said regulation means providing a first digital signal having a magnitude varying in accordance with that of said first signal, said regulation means having a preselected base number having a magnitude representative of said predetermined magnitude of said first signal, said regulation means comparing said first digital signal and said base number for deriving said error number and said control circuit modifying said trigger sequence number with said error number whereby said time of occurrence will be changed.

4. The circuit of claim 3 with said first signal being an analog signal and with said regulation means digitally determining said first digital signal from the analog of said first signal by a successive approximation cycle.

5. The circuit of claim 4 with said approximation cycle being concluded before the occurrence of each trigger pulse and with said regulation means being responsive at the completion of said approximation cycle for modifying said trigger sequence number by said error number.

6. In a static converter for converting between a three phase a-c voltage and a d-c voltage by means of a rectifier circuit comprising at least one controlled rectifier associated with each phase and wherein the conduction of such one controlled rectifier is controlled by trigger pulses applied to a gate electrode with one of the a-c and d-c voltages being variable in magnitude by controlling the time of occurrence at which the trigger pulses are applied to the gate electrode, an improved controlled trigger circuit comprising: timing means for digitally timing the interval between phases relative to a determinable time occurrence of at least one phase of the three phase a-c and for determining therefrom a trigger sequence number representative of sixty electrical degrees and for providing the trigger pulse upon attainment of a digital count of said trigger sequence number which is representative of the time between successive trigger pulses, regulation means responsive to variations in magnitude of at least one of the voltage and current from one of the a-c and d-c voltages and for digitally providing an error number varying in magnitude in response to such variations, control circuit means responsive to said error number for varying the magnitude of said trigger sequence number at said timing means whereby the time between successive trigger pulses will be varied from sixty electrical degrees and hence said time of occurrence will be varied to regulate the magnitude of said at least one of the voltage and current, fixed frequency clock means for providing clock pulses at a known fixed frequency from which the timing functions are performed, said regulation means including means for providing a reference signal which when at a preselected magnitude is indicative of a desired magnitude of the at least one of voltage and current, said regulation means providing a first signal in response to said reference signal and varying in magnitude in accordance with variations in the at least one of the voltage and current, said regulation means providing a first digital signal having a magnitude digitally determined from the magnitude of said first signal, said regulation means having a preselected base number having a magnitude representative of said desired magnitude of the at least one of the voltage and current, said regulation means responsive to said first digital signal and said base number for deriving an error number, said control circuit means modifying said trigger sequence number in accordance with said error number whereby said time of occurrence will be changed, said regulation means operating on said first signal with a predetermined comparison cycle for successively varying the magnitude of said first digital signal whereby said first digital signal will ultimately have a magnitude representative of that of said first signal, said predetermined comparison cycle being conducted before the occurrence of each trigger pulse and with said regulation means being responsive at the completion of said comparison cycle for determining said error number whereby said control circuit means will modify said trigger sequence number by said error number at the completion of said comparison cycle.

7. In a static converter for converting between a three phase a-c voltage and a d-c voltage by means of a rectifier circuit comprising at least one controlled rectifier associated with each phase and wherein the conduction of such one controlled rectifier is controlled by trigger pulses applied to a gate electrode with one of the a-c and d-c voltages being variable in magnitude by controlling the time of occurrence at which the trigger pulses are applied to the gate electrode, an improved controlled trigger circuit comprising: fixed frequency clock means for providing clock pulses at a known fixed frequency, timing means operative with said clock pulses for digitally timing the interval between phases relative to a determinable time occurrence on at least one phase of the three phase a-c and for determining therefrom a trigger sequence number representative of sixty electrical degrees and for providing the trigger pulse upon attainment of a digital count of said trigger sequence number, regulation means for determining variations in magnitude of at least one of the voltage and current from one of the a-c and d-c voltages and responsive to said clock pulses for digitally providing an error number responsive to such variations, control circuit means responsive to said error number for varying the magnitude of said trigger sequence number at said timing means whereby the time between successive trigger pulses will be varied from sixty electrical degrees to regulate the magnitude of said at least one of the voltage and current, said regulation means providing a reference signal having a magnitude indicative of a desired magnitude of the at least one of the voltage and current, said regulation means in response to said reference signal providing a first signal in response to and varying the magnitude in accordance with said at least one of the voltage and current, said first signal being an analog signal, said regulation means providing a first digital signal having a magnitude digitally determined from the magnitude of said first signal, said regulation means providing a preselected base number having a magnitude representative of said desired magnitude of the at least one of the voltage and current, said regulation means responsive to said first digital signal and said base number for deriving said error number, digital to analog means for generating a comparison analog signal in response to said first digital signal, said regulation means including comparator circuit means for comparing said comparison analog signal with said first analog signal, said regulation means having a predetermined comparison cycle for successively digitally varying the magnitude of said first digital signal and hence of said comparison analog signal in a comparison cycle until said comparison analog signal and said first analog signal have magnitudes most proximate to each other, said predetermined comparison cycle being concluded before the occurrence of each trigger pulse and with said regulation means being responsive at the completion of said comparison cycle for determining said error number and said control circuit means modifying said trigger sequence number accordingly.

8. The circuit of claim 7 further comprising trigger circuit means including a plurality of logic devices with at least one associated with each phase and each responsive to first and second input signals for providing said trigger pulses, said timing means providing said first input signal in response to attainment of said trigger sequence number, pulse generating means for providing a plurality of output pulses being said second input signals and being actuable in response to an actuating signal from said timing means in response to attainment of said trigger sequence number for providing in response thereto said plurality of output pulses as said second input signal whereby said logic devices will provide the trigger pulses, one of said first and second input signals being simultaneously transmitted to at least two of said plurality of logic devices.

9. The circuit of claim 8 with said regulation means receiving a first phase signal providing an indication of a first reference point related to a first phase of the three phase a-c, said regulation means receiving a second phase signal providing an indication of a second reference point on said second phase signal related to a second phase of the three phase a-c, sequence means operating in response to said first and second phase signals for determining the proper phase rotation of the three phases of the three phase source.

10. The circuit of claim 9 with said regulation means shutting the converter down in absence of said first and second phase signals.

11. The circuit of claim 10 including peak limiting means for determining occurrences of the one of voltage and current of excessive magnitude and for providing a disabling signal to said regulation means for shutting the converter down.

12. The circuit of claim 11 with said regulation means resetting said trigger circuit in response to said disabling signal and for permanently shutting the converter down in response to a preselected number of said disabling signals in a selected time interval.

13. The circuit of claim 12 with said first and second reference points being determined by logic devices having a Schmitt trigger type output with said reference points being at the conclusion of the Schmitt trigger signal.

14. The circuit of claim 13 with said output pulses of said second input signals being of a higher frequency than said first input signal whereby said each of the trigger pulses comprises a plurality of pulses as determined by said output pulses of said second input signals.

15. The circuit of claim 14 with said regulation means responsive to said first reference point as a first stop limit and determining a second stop limit from said first stop limit, said first and second stop limits being at the outer ends of but within the half cycle of the first phase, said regulation means being responsive to the time of attainment of said trigger sequence number relative to said first and second stop limits for providing an abrupt change in said trigger sequence number when the time for the trigger pulse for the first phase is at a preselected time relative to said first or second stop limits.

16. The circuit of claim 8 with said one of said first and second input signals being simultaneously transmitted to each of said plurality of logic devices and providing a series of pulses during the time interval of the other of said first and second input signals.

17. In a static converter for converting between a three phase a-c voltage and a d-c voltage by means of a rectifier circuit comprising at least one controlled rectifier associated with each phase and wherein the conduction of such one controlled rectifier is controlled by trigger pulses applied to a gate electrode with at least one of the a-c and d-c voltage being variable in magnitude by controlling the time of occurrence at which the trigger pulses are applied to the gate electrode, the method of regulating the magnitude of at least one of the voltage and current of the at least one of the a-c and d-c voltage by varying said time of occurrence, said method comprising the steps of: utilizing a known fixed frequency source and digitally determining the time between each trigger pulse as a trigger sequence number, providing the trigger pulse upon attainment of a digital count of the trigger sequence number, determining variations in the magnitude of the at least one of the voltage and current, varying the magnitude of the trigger sequence number in response to variations in the magnitude of the at least one of the voltage and current whereby said time of occurrence will be varied to regulate the magnitude of the at least one of the voltage and current.

18. In a static converter for converting between a three phase a-c voltage and a d-c voltage by means of a rectifier circuit comprising at least one controlled rectifier associated with each phase and wherein the conduction of such one controlled rectifier is controlled by trigger pulses applied to a gate electrode with at least one of the a-c and d-c voltage and current being variable in magnitude by controlling the time of occurrence at which the trigger pulses are applied to the gate electrode, the method of regulating the magnitude of the at least one of the a-c and d-c voltage and current by varying said time of occurrence, said method comprising the steps of: digitally determining the time between each trigger pulse as a trigger sequence number, providing the trigger pulse upon attainment of a digital count of the trigger sequence number, determining variations in the magnitude of the at least one of the a-c and d-c voltage and current, varying the magnitude of the trigger sequence number in response to variations in the magnitude of the at least one of the a-c and d-c voltage and current whereby said time of occurrence will be varied to regulate the magnitude of the at least one of the a-c and d-c voltage and current, providing a first analog signal having a magnitude varying in accordance with variations in the magnitude of the at least one of the a-c and d-c voltage and current, providing a first digital signal having a magnitude varying in accordance with the magnitude of the first analog signal, providing a base number having a magnitude indicative of the desired magnitude of the at least one of the a-c and d-c voltage and current, comparing the first digital signal with the base number and providing therefrom an error number, varying the trigger sequence number by the error number whereby a change in said time of occurrence of the trigger pulses will occur, utilizing the pulses from a known, fixed frequency clock to perform the digital counting and timing functions.

19. The method of claim 18 with the steps of providing a second analog signal for comparison with the first analog signal with the second analog signal having a magnitude determined by the first digital signal and comparing the magnitudes of the first and second analog signals and successively varying the magnitude of the first digital signal and hence of the second analog signal to bring the magnitude of the second analog signal and hence the first digital signal towards the magnitude of the first analog signal.

20. The method of claim 19 comprising the further steps of: determining a first reference point for one of the three a-c phases, determining a second reference point for a second one of the three a-c phases, determining the sequence of rotation of the three phases based upon the time difference between the first and second reference points.

21. The method of claim 20 comprising the further steps of: utilizing the first reference point as a first stop limit for the one phase, determining a second stop limit for the one phase based upon the first reference point whereby the first stop limit will be proximate the end of a half cycle of the one phase and the second stop limit will be proximate the beginning of such half cycle, providing an abrupt increase in the pulse sequence number when the time of occurrence for the one trigger pulse associated with the one phase is at a preselected position relative to the first and second stop limits.

22. The method of claim 21 with the preselected position being determined by the time intervals for the trigger pulses just before and after the one trigger pulse.

* * * * *

UNITED STATES PATENT AND TRADEMARK OFFICE
CERTIFICATE OF CORRECTION

PATENT NO. : 4,347,562

DATED : August 31, 1982

INVENTOR(S) : James H. Galloway

It is certified that error appears in the above-identified patent and that said Letters Patent are hereby corrected as shown below:

Abstract, line 7, delete "signal" and substitute therefor --signals--.
Column 1, line 66, delete "furthr" and substitute therefor --further--.
Column 4, line 9, delete "and" and substitute therefor --or--.
Column 5, line 67, delete "additional" and substitute therefor --addition--.
Column 8, line 19, delete "$V_{REF}+$" and substitute therefor --$V_{REF}-$--.
Column 8, line 42, delete "to" first occurrence.
Column 12, line 12, delete "e.g." and substitute therefor --i.e.--.
Column 12, line 23, delete "the" and substitute therefor --that--.
Column 13, line 48, delete "from" and substitute therefor --form--.
Column 13, line 51, delete "disired" and substitute therefor --desired--.
Column 25, line 62, under heading "MNEMONIC", delete "MOV R0,#F" and substitute therefor --MOV. R0,#1F--.
Column 29, line 81, under heading "MNEMONIC" delete "ANL A,@02" and substitute therefor --ANL A,#02--.

Signed and Sealed this

Thirty-first Day of January 1984

[SEAL]

Attest:

GERALD J. MOSSINGHOFF

Attesting Officer

Commissioner of Patents and Trademarks